United States Patent
Dairoku et al.

(10) Patent No.: US 8,436,090 B2
(45) Date of Patent: May 7, 2013

(54) PRODUCTION METHOD AND METHOD FOR ENHANCING LIQUID PERMEABILITY OF WATER-ABSORBING RESIN

(75) Inventors: Yorimichi Dairoku, Himeji (JP); Kozo Nogi, Himeji (JP); Syuji Kanzaki, Himeji (JP); Kunihiko Ishizaki, Himeji (JP); Koji Matsumoto, Himeji (JP); Yoshiro Mitsukami, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 225 days.

(21) Appl. No.: 13/061,581

(22) PCT Filed: Sep. 11, 2009

(86) PCT No.: PCT/JP2009/065948
§ 371 (c)(1),
(2), (4) Date: Mar. 1, 2011

(87) PCT Pub. No.: WO2010/032694
PCT Pub. Date: Mar. 25, 2010

(65) Prior Publication Data
US 2011/0166300 A1  Jul. 7, 2011

(30) Foreign Application Priority Data

Sep. 16, 2008 (JP) ................... 2008-236545
Sep. 18, 2008 (JP) ................... 2008-238918
Sep. 22, 2008 (JP) ................... 2008-242697

(51) Int. Cl.
| C08F 220/06 | (2006.01) |
| C08F 20/06 | (2006.01) |
| C08F 8/14 | (2006.01) |
| C08G 63/60 | (2006.01) |

(52) U.S. Cl.
USPC ........ 524/556; 524/599; 526/317.1; 526/319; 525/384

(58) Field of Classification Search .......... 524/556, 524/599; 526/317.1, 319; 525/384
See application file for complete search history.

(56) References Cited

U.S. PATENT DOCUMENTS

| RE32,649 E | 4/1988 | Brandt et al. |
| 5,149,335 A | 9/1992 | Kellenberger et al. |
| 5,562,646 A | 10/1996 | Goldman et al. |
| 6,323,252 B1 | 11/2001 | Gartner et al. |
| 6,414,214 B1 | 7/2002 | Engelhardt et al. |
| 6,716,894 B2 | 4/2004 | Kajikawa et al. |
| 6,727,345 B2 | 4/2004 | Kajikawa et al. |
| 6,849,665 B2 | 2/2005 | Frenz et al. |
| 7,169,843 B2 | 1/2007 | Smith et al. |
| 7,173,086 B2 | 2/2007 | Smith et al. |
| 7,193,006 B2 | 3/2007 | Ishizaki et al. |
| 2001/0025093 A1 * | 9/2001 | Ishizaki et al. ................ 526/210 |
| 2002/0128618 A1 | 9/2002 | Frenz et al. |
| 2004/0138362 A1 | 7/2004 | Kim |
| 2005/0245684 A1 | 11/2005 | Daniel et al. |
| 2005/0256469 A1 | 11/2005 | Qin et al. |
| 2007/0293617 A1 | 12/2007 | Riegel et al. |
| 2008/0125533 A1 | 5/2008 | Riegel et al. |

FOREIGN PATENT DOCUMENTS

| JP | 6-329716 | 11/1994 |
| JP | 06329716 A * | 11/1994 |
| JP | 2002-121291 | 4/2002 |
| JP | 2003-105092 | 4/2003 |
| JP | 2004-359943 | 12/2004 |
| WO | 2006/074816 | 7/2006 |
| WO | 2006/082189 | 8/2006 |
| WO | 2006/082197 | 8/2006 |
| WO | 2008/025652 | 3/2008 |
| WO | 2008/025655 | 3/2008 |
| WO | 2008/025656 | 3/2008 |
| WO | 2008/092842 | 8/2008 |
| WO | 2008/092843 | 8/2008 |
| WO | 2009/113672 | 9/2009 |
| WO | 2010/114058 | 10/2010 |

OTHER PUBLICATIONS

U.S. Appl. No. 13/258,645, filed Sep. 22, 2011, Dairoku et al.

* cited by examiner

*Primary Examiner* — Michael M Bernshteyn
(74) *Attorney, Agent, or Firm* — Occhiuti Rohlicek & Tsao LLP

(57) ABSTRACT

A method for the production of a water-absorbing resin is to be provided which permits enhancement and stabilization of property, for example, liquid permeability, of a water-absorbing resin by a simple and convenient method without requiring change of raw materials or expensive facility investment. The method comprises a polymerization step for polymerizing an aqueous solution of acrylic acid (or salt thereof) to obtain a hydrogel cross-linked polymer; a drying step for drying the hydrogel cross-linked polymer to obtain a water-absorbing resin powder; a classification step for classifying the water-absorbing resin powder; and a surface cross-linking step for surface cross-linking the water-absorbing resin powder before or after the classification step, wherein electricity is eliminated in the classification step.

23 Claims, 1 Drawing Sheet

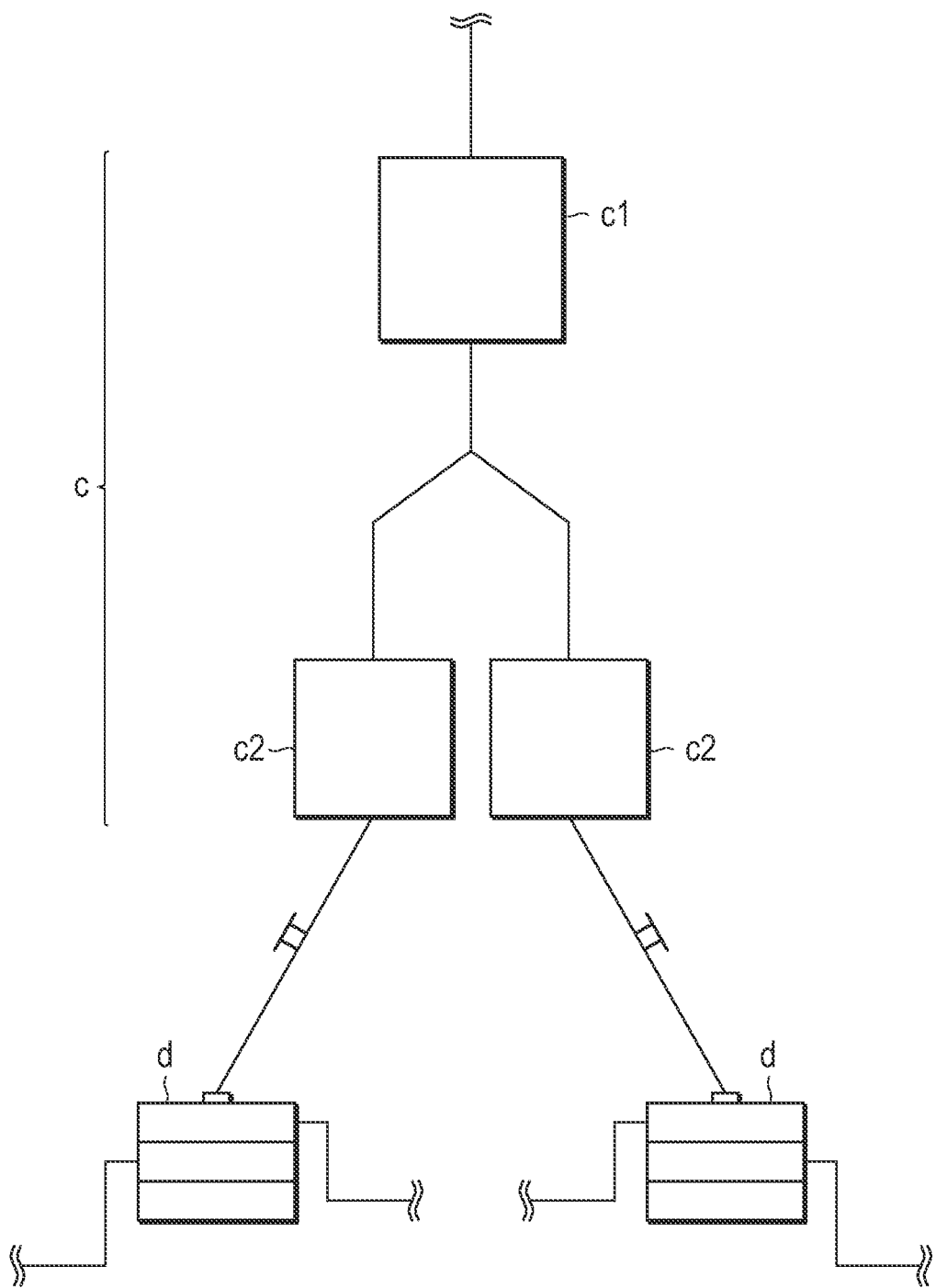

PRODUCTION METHOD AND METHOD FOR ENHANCING LIQUID PERMEABILITY OF WATER-ABSORBING RESIN

CROSS REFERENCE TO RELATED APPLICATIONS

This application is a National Stage of International Application No. PCT/JP2009/065948, filed on Sep. 11, 2009 which claims priority to Japanese Application No. 2008-236545 filed Sep. 16, 2008, Japanese Application No. 2008-238918 filed Sep. 18, 2008 and Japanese Application No. 2008-242697 filed Sep. 22, 2008. The content of the prior applications are incorporated herein by reference in their entirety.

TECHNICAL FIELD

The present invention relates to a production method and a method for enhancing liquid permeability of a water-absorbing resin. More specifically, the present invention relates to a production method to obtain a water-absorbing resin showing high liquid permeability under high-pressure conditions by performing surface cross-linking, and a method for enhancing liquid permeability of a water-absorbing resin.

BACKGROUND ART

A water-absorbing resin (SAP/Super Absorbent Polymer) is a water-swelling and water-insoluble polymer gelling agent, and has been frequently used principally as disposable applications, as absorbing articles such as disposable diapers, sanitary napkins, a water retention agent for gardening and agriculture, an industrial use water stop material or the like. As such a water-absorbing resin, those using many monomers or hydrophilic polymers as raw materials have been proposed. Among them, in particular, a polyacrylic acid (or salt thereof)-based water-absorbing resin obtained by using acrylic acid and/or a salt thereof as a monomer has been used industrially in the highest amount, in view of its high water-absorbing performance.

Such a water-absorbing resin is produced through a polymerization step, a drying step, a pulverization step, a classification step, a surface cross-linking step or the like (Patent Documents 1 to 3). Accompanying with higher performance of disposable diapers as a principal application, a water-absorbing resin has also been required many functions. Specifically, many properties including, as well as high water absorption capacity, gel strength, water-soluble content (Patent Document 4), water absorbing speed, absorption against pressure (Patent Document 5), liquid permeability, particle size distribution, urine resistance, antibiotic property, impact resistance, powder fluidity, deodorant property, coloring resistance, low powder dust and the like have been required to be imparted to the water-absorbing resin. Therefore, many proposals such as surface cross-linking technology, additives, changes of production steps and the like have been offered also in other than the above or following Patent Documents 1 to 23.

In recent years, with increase of use amount (for example, equal to or higher than 50% by weight) of the water-absorbing resin in disposable diapers, liquid permeability has been considered as a more important factor. And, many improvement methods or modification technologies for liquid permeability under load or liquid permeability without load, such as SFC (saline flow conductivity/Patent Document 6) or GBP (Gel Bed Permeability/Patent Documents 7 to 9) have been proposed.

In addition, in such properties, many combinations of a plurality of parameters including liquid permeability have also been proposed, and there have been known a technology for specifying frangibility index (FI) (Patent Document 10), technology for specifying water absorbing speed (FSR/Vore-tex) or the like (Patent Document 11), and a technology for specifying product of Saline Flow Conductivity (SFC) and wicking absorption after 60 minutes (DA60) multiplied (Patent Document 12).

Further, as enhancement methods for liquid permeability such as SFC or GBP, there have been known a technology for adding gypsum before or during polymerization (Patent Document 13), a technology for adding a spacer (Patent Document 14), a technology for using a nitrogen-containing polymer having 5 to 17 moles/kg of a nitrogen atom which is capable of protonation (Patent Document 15), a technology for using polyamine and a polyvalent metal ion or a polyvalent anion (Patent Document 16), a technology for coating a water-absorbing resin having a pH of below 6 with polyamine (Patent Document 17), and a technology for using polyammonium carbonate (Patent Document 18). Other than these, a technology for using polyamine with a soluble content of equal to or higher than 3%, and a technology for specifying wicking index (WI) or gel integrity (Patent Documents 19 to 21) have been known. In addition, for improving coloring and liquid permeability, a technology for using a polyvalent metal salt while controlling methoxyphenol which is a polymerization inhibitor in polymerization (Patent Documents 22, 23) has also been known.

PRIOR DOCUMENTS

Patent Documents

Patent Document 1: U.S. Pat. No. 6,727,345
Patent Document 2: U.S. Pat. No. 7,193,006
Patent Document 3: U.S. Pat. No. 6,716,894
Patent Document 4: USP (reissue) No. 32649
Patent Document 5: U.S. Pat. No. 5,149,335
Patent Document 6: U.S. Pat. No. 5,562,646
Patent Document 7: US 2005/0256469 A1
Patent Document 8: U.S. Pat. No. 7,169,843
Patent Document 9: U.S. Pat. No. 7,173,086
Patent Document 10: U.S. Pat. No. 6,414,214
Patent Document 11: U.S. Pat. No. 6,849,665
Patent Document 12: US 2008/125533 A1
Patent Document 13: US 2007/293617 A1
Patent Document 14: US 2002/0128618 A1
Patent Document 15: US 2005/0245684 A1
Patent Document 16: WO 2006/082197 pamphlet
Patent Document 17: WO 2006/074816 pamphlet
Patent Document 18: WO 2006/082189 pamphlet
Patent Document 19: WO 2008/025652 pamphlet
Patent Document 20: WO 2008/025656 pamphlet
Patent Document 21: WO 2008/025655 pamphlet
Patent Document 22: WO 2008/092843 pamphlet
Patent Document 23: WO 2008/092842 pamphlet

DISCLOSURE OF THE INVENTION

Problem to be Solved by the Invention

Many surface cross-linking technologies, additives, and changes of the production steps, have been proposed in the Documents 1 to 23 and the like in order to enhance property of the water-absorbing resin.

However, the change or addition of raw materials of a water-absorbing resin, such as a surface cross-linking agent or additive (polyamine polymer, inorganic fine particle, thermoplastic polymer) have sometimes induced not only decrease in safety of the raw materials or cost increase but also decrease in other properties. In addition, the addition of a new production step has not only provided a factor of cost increase by expensive facility investment or energy therefor but also incurred decrease in productivity or property on the contrary, due to requirement of industrially complicated operation.

Accordingly, it is an object of the present invention, in order to improve the problems, to provide a method for enhancing and stabilizing property (for example, liquid permeability) of a water-absorbing resin by a simple and convenient method without requiring change of raw materials or expensive facility investment.

Means for Solving the Problem

In order to solve the problems, the production method for the water-absorbing resin of the present invention (a first aspect) is as follows.

(1) A method for the production of a water-absorbing resin which comprises a polymerization step for polymerizing an aqueous solution of acrylic acid (or salt thereof) to obtain a hydrogel cross-linked polymer, a drying step for drying the hydrogel cross-linked polymer to obtain a water-absorbing resin powder, a classification step for classifying the water-absorbing resin powder, and a surface cross-linking step for surface cross-linking the water-absorbing resin powder before or after the classification step, wherein electricity is eliminated in the classification step.

(2) The method according to (1), wherein the electricity is eliminated by at least one means selected from the group consisting of ionized air flow, antistatic brush and grounding.

(3) The method according to (1) or (2), wherein the electricity is eliminated by grounding wherein earth resistance is equal to or lower than 100Ω.

(4) The method according to any one of (1) to (3), wherein the classification step is performed under reduced pressure.

(5) The method according to any one of (1) to (4), wherein air flow is passed through the classification step, and dew point of the air flow is equal to or lower than 15° C.

(6) The method according to any one of (1) to (5), wherein sieve classification is used in the classification step, and a temperature of a sieve to be used in the classification step is 40 to 80° C.

(7) The method according to any one of (1) to (6), wherein sieves having at least three kinds of sieve mesh sizes are used in the classification step.

(8) The method according to any one of (1) to (7), wherein normal saline flow conductivity (SFC) of the water-absorbing resin subjected to the surface cross-linking step is equal to or higher than 10 ($\times 10^{-7} \cdot cm^3 \cdot s \cdot g^{-1}$).

(9) The method according to any one of (1) to (8), wherein sieve classification is used in the classification step, and a surface roughness (Rz) of an inner surface of a sieve to be used in the classification step is equal to or smaller than 800 nm.

(10) The method according to any one of (1) to (9), wherein the water-absorbing resin is continuously produced in an amount of equal to or higher than 1 ton per 1 hour.

(11) The method according to any one of (1) to (10), wherein the water-absorbing resin is produced in the shape of an irregular particle by continuous kneader polymerization or continuous belt polymerization.

(12) The method according to any one of (1) to (11), wherein the water content of the water-absorbing resin is equal to or lower than 5% by weight.

(13) The method according to any one of (1) to (12), further comprising an iron removal step after the classification step.

(14) The method according to any one of (1) to (13), wherein the classification step is performed before and after the surface cross-linking step.

(15) The method according to any one of (1) to (14), further comprising a step for recycling fine powder of the water-absorbing resin after the classification step.

(16) The method according to any one of (1) to (15), wherein the water-absorbing resin before and after the classification step is pneumatically transported by air having a dew point of equal to or lower than 20° C.

(17) The method according to any one of (1) to (16), wherein the electricity is eliminated for at least one of a classification apparatus, the water-absorbing resin and a sieve used in the sieve classification.

(18) The method according to any one of (1) to (17), wherein steps from the polymerization step prior to the classification step is arrayed in one line, and the classification step is divided into two or more lines.

(19) The method according to any one of (1) to (18), wherein the surface cross-linking step is divided into two or more lines per one line of the polymerization step.

(20) The method according to any one of (1) to (19), wherein all of the classification step and the surface cross-linking step are divided in two or more lines per one line of the polymerization step.

(21) The method according to any one of (1) to (20), wherein a covalent surface cross-linking agent and an ion binding surface cross-linking agent are used in combination in the surface cross-linking step.

In addition, to solve the problems, the method for enhancing liquid permeability of a water-absorbing resin of the present invention (a second aspect) is as follows.

(22) A method for enhancing liquid permeability of a water-absorbing resin which comprises a polymerization step for polymerizing an aqueous solution of acrylic acid (or salt thereof) to obtain a hydrogel cross-linked polymer, a drying step for drying the hydrogel cross-linked polymer to obtain a water-absorbing resin powder, a classification step for classifying the water-absorbing resin powder, and a surface cross-linking step for surface cross-linking the water-absorbing resin powder before or after the classification step, wherein electricity is eliminated in the classification step.

(23) The method according to (21), wherein normal saline flow conductivity (SFC) of the water-absorbing resin subjected to the surface cross-linking step is equal to or higher than 10 ($\times 10^{-7} \cdot cm^3 \cdot s \cdot g^{-1}$).

Effects of the Invention

According to the present invention, in the method for producing a water-absorbing resin comprising a polymerization step, a drying step, a classification step, and a surface cross-linking step, property (for example, liquid permeability) after surface cross-linking can be enhanced, as well as variation of property (standard deviation) can be decreased in continuous production.

BRIEF DESCRIPTION OF THE DRAWINGS

FIG. 1 is a drawing showing a schematic configuration of a pulverization apparatus and a classification apparatus which can be used in the production method of the present invention.

BEST MODE FOR CARRYING OUT THE INVENTION

Explanation will be given below in detail on the production method and the enhancing method for liquid permeability of a water-absorbing resin relevant to the present invention. However, the scope of the present invention should not be restricted to these explanations, and also embodiments other than the following exemplifications may be changed as appropriate and performed in a range not to impair the gist of the present invention. Specifically, the present invention should not be limited to each of the following embodiments, and various changes are possible within a scope defined in the claims, and also embodiments obtained by combining as appropriate technological means disclosed each in different embodiments are encompassed within the technological scope of the present invention.

(1) Definition of Terms (a) "Water-Absorbing Resin"

The "water-absorbing resin" means a water-swelling and water-insoluble polymer gelling agent, and one having the following properties. That is, it means a polymer gelling agent having an absorption against non-pressure (CRC) of essentially equal to or higher than 5 g/g, preferably 10 to 100 g/g, and further preferably 20 to 80 g/g, and in addition, water-soluble content (Extractables) of essentially 0 to 50% by weight, preferably 0 to 30% by weight, further preferably 0 to 20% by weight, and particularly preferably 0 to 10% by weight.

It should be noted that, the water-absorbing resin is not limited to a form where whole amount (100%) is a polymer, and may include an additive (which is described later or the like), in a range to maintain the performance. That is, even a water-absorbing resin composition containing the water-absorbing resin and additive, it is called generically the water-absorbing resin in the present invention. When the water-absorbing resin is a water-absorbing resin composition, a content of the water-absorbing resin (a polyacrylic acid (or salt thereof)-based water-absorbing resin) is preferably 70 to 99.9% by weight, more preferably 80 to 99.7% by weight, and still more preferably 90 to 99.5% by weight, relative to total amount. As a component other than the water-absorbing resin, in view of water absorbing speed or impact resistance of powder (particle), water is preferable, and the additives to be described later may be contained as needed.

(b) "Polyacrylic Acid (or Salt Thereof)"

The "polyacrylic acid (or salt thereof)" means a polymer having acrylic acid (or salt thereof) as a main component, as a repeating unit. Specifically, it means a polymer containing acrylic acid (or salt thereof) essentially in 50 to 100% by mole, preferably 70 to 100% by mole, further preferably 90 to 100% by mole, particularly preferably substantially 100% by mole, as a monomer excluding a cross-linking agent. The salt as the polymer contains essentially a water-soluble salt, and is preferably a monovalent salt, more preferably an alkali metal salt or an ammonium salt, still more preferably an alkali metal salt, and particularly preferably a sodium salt. It should be noted that, although the shape is not especially limited, a particle or a powder is preferable.

(c) "Liquid Permeability"

Flow of liquid flowing between particles of swollen gel under load or without load is referred to as "liquid permeability", and a typical method for measuring this "liquid permeability", there is SFC (saline flow conductivity) or GBP (Gel Bed Permeability).

"SFC (saline flow conductivity)" is a value showing liquid permeability for a 0.69% by weight normal saline solution in swelling of the water-absorbing resin, and the higher SFC value shows that the water-absorbing resin has higher liquid permeability.

Such saline flow conductivity is measured in accordance with SFC test described in U.S. Pat. No. 5,849,405. "GBP" indicates liquid permeability for a 0.9% by weight normal saline solution of the water-absorbing resin under load or in free expansion. It is measured in accordance with GBP test described in WO 2005/016393 pamphlet.

(d) "Standard Deviation"

"Standard deviation" is a value showing a degree of data scattering and is calculated as follows: difference between value of n pieces of data and arithmetic average thereof, that is, deviation, is squared and averaged, and it is divided with n−1, which is used to find a positive square root thereof. Standard deviation is used to know variation degree for phenomenon with a large amount of variation. It should be noted that, in the present description, standard deviation is utilized to express, as numerical value, variation (deflection) for desired property value.

$n$ pieces of data $X1, X2, \ldots, Xn$ [Expression 1]

$$\text{Arithmetic average } X = \frac{1}{n}\sum_{i=1}^{n} Xi$$

$$\text{Standard deviation} = \sqrt{\frac{1}{n-1}\sum_{i=1}^{n}(Xi - X)^2}$$

(e) "EDANA" and "ERT"

"EDANA" is an abbreviation of European Disposables and Nonwovens Association, and "ERT" is an abbreviation of measurement method for a water-absorbing resin of an European standard (nearly a world standard) (ERT/EDANA Recommended Test Method). In the present description, unless otherwise specified, properties of a water-absorbing resin are measured based on the ERT original (known document: revised in 2002).

(e-1) "CRC" (ERT441.2-02)

"CRC" is an abbreviation of Centrifuge Retention Capacity and means absorption against non-pressure (it may also be referred to simply "Absorption"). Specifically, it is absorption (unit; g/g) after freely swelling a water-absorbing resin with an aqueous 0.9% by weight sodium chloride solution for 30 minutes and draining water therefrom with a centrifugal separating machine.

(e-2) "AAP" (ERT442.2-02)

"AAP" is an abbreviation of absorption against pressure, and means absorption under load. Specifically, it means absorption (unit; g/g) after swelling a water-absorbing resin with an aqueous 0.9% by weight sodium chloride solution under a load of 1.9 kPa for 1 hour. It should be noted that in the present invention and Examples, it was measured under a load of 4.8 kPa.

(e-3) "Extractables" (ERT470.2-02)

"Extractables" mean a water-soluble content (amount of solubles). Specifically, it is a value (unit; % by weight) obtained by stirring 1 g of a water-absorbing resin in 200 g of an aqueous 0.9% by weight sodium chloride solution for 16 hours, and measuring an amount of dissolved polymer by pH titration.

(e-4) "Residual Monomers" (ERT410.2-02)

"Residual Monomers" mean an amount of monomers remaining in a water-absorbing resin. Specifically, it is a value (unit; ppm by weight) obtained by charging 0.5 g of a water-absorbing resin into an aqueous 0.9% by weight sodium chloride solution, stirring the mixture for 2 hours, and measuring an amount of eluted monomers into the aqueous solution by high-performance liquid chromatography.

(e-5) "PSD" (ERT420.2-02)

"PSD" is an abbreviation of Particle Size Distribution and means particle size distribution measured by sieve classification. It should be noted that weight average particle diameter and particle diameter distribution width are measured by a method similar to "(1) Average Particle Diameter and Distribution of Particle Diameter" described in EP-B-0349240, page 7, lines 25 to 43.

(e-6) Others

"pH" (ERT400.2-02): It means pH of a water-absorbing resin.

"Moisture Content" (ERT430.2-2): It means a water content of a water-absorbing resin.

"Flow Rate" (ERT450.2-02): It means a flow-down speed of a water-absorbing resin powder.

"Density" (ERT460.2-02): It means a bulk density of a water-absorbing resin.

(f) "Water-Absorbing Resin Powder"

A "water-absorbing resin powder" indicates a water-absorbing resin having a certain fluidity as a powder substance. For example, it means a water-absorbing resin whose fluidity, Flow Rate (ERT450.2-02), can be measured, or which can be classified with a sieve by PSD (ERT420.2-02). Specifically, it means a water-absorbing resin with a particle diameter of equal to or smaller than 5 mm, as specified by sieve classification. A water content is not especially limited, as long as it is a water-absorbing resin. In general, however, it preferably is below 30% by weight, and more preferably equal to or smaller than 20% by weight. The lower limit of the particle diameter is not especially limited. It, however, is equal to or larger than 1 nm, for example. It should be noted that, in general, one having a particle diameter of equal to or larger than 1 mm is called a "particle substance", and one below 1 mm is called a "powder substance". In the present description, a dried substance obtained in a drying step to be described later, a pulverized dried substance obtained in a pulverization step to be described later, and a classified substance obtained in a classification step to be described later are generically called a "water-absorbing resin powder". In addition, in the present description, the "powder substance" and the "powder" are used interchangeably.

(g) Others

In the present description, "X to Y" showing a range indicates to be equal to or higher than X and equal to or lower than Y. In addition, "t (ton)" as a unit of weight means "Metric Ton".

Measurement of property of a water-absorbing resin may be performed under conditions of a temperature of 20 to 25° C. (it may be referred to simply as "room temperature" or "normal temperature") and a relative humidity of 40 to 50%, unless otherwise specified.

[2] Production Method of Water-Absorbing Resin (1) Polymerization Step

The present step is a step for polymerizing an aqueous solution of acrylic acid (or salt thereof) to obtain a hydrogel cross-linked polymer.

(a) Monomer (Excluding a Cross-Linking Agent)

The water-absorbing resin relevant to the present invention uses an aqueous solution of acrylic acid (or salt thereof) as a raw material (monomer) thereof. The aqueous solution contains acrylic acid and/or a salt thereof as a main component. In addition, it is preferable that the hydrogel cross-linked polymer obtained by polymerization (hereafter may also be referred to as "hydrogel") has at least at a part of the acid groups in the polymer neutralized, in view of water absorption characteristics. Such a partially neutralized salt of acrylic acid is not especially limited. In view of performance of water-absorbing resin, it is preferably a monovalent salt of acrylic acid selected among an alkali metal salt, an ammonium salt and an amine salt of acrylic acid, more preferably an alkali metal salt of acrylic acid, and still more preferably an acrylate selected among sodium salt, lithium salt and potassium salt, and particularly preferably sodium salt.

Therefore, a basic substance, which can be used in neutralization of acrylic acid as a monomer, or a polymer (hydrogel) after polymerization, is not especially limited. Monovalent basic substances such as hydroxides of alkali metal such as sodium hydroxide, potassium hydroxide, lithium hydroxide, or (hydrogen) carbonate salts such as sodium (hydrogen) carbonate, potassium (hydrogen) carbonate may be preferably cited, and sodium hydroxide is particularly preferable.

A polymer (hydrogel) after polymerization may be neutralized, or polymerization may be performed using a salt of acrylic acid as a monomer. In view of enhancement of productivity or AAP (absorption against pressure) and the like, a neutralized monomer is preferably used, that is, a partially neutralized salt of acrylic acid is preferably used as a monomer.

A neutralization ratio in the neutralization step is not especially limited. It is preferably 10 to 100% by mole, more preferably 30 to 95% by mole, still more preferably 50 to 90% by mole, and particularly preferably 60 to 80% by mole. In addition, temperature in neutralization (neutralization temperature) is not especially limited. It can be determined as appropriate from preferably 10 to 100° C., and still more preferably 30 to 90° C. Preferable conditions or the like of neutralization treatment have been exemplified in EP Patent No. 574260, and conditions described therein may be also applied to the present invention.

The above-described monomer (including the following cross-linking agent) may be usually polymerized as an aqueous solution, and concentration of solid content thereof is usually 10 to 90% by weight, preferably 20 to 80% by weight, still more preferably 30 to 70% by weight, and particularly preferably 35 to 60% by weight.

Further, in order to improve various properties of the water-absorbing resin obtained, a water-soluble resin or a water-absorbing resin such as starch, polyacrylic acid (or salt thereof), polyethyleneimine, various foaming agents (carbonate, azo compound, bubbles and the like), a surfactant, and additives to be described later may be added as an arbitrary component, to an aqueous solution of acrylic acid (or salt thereof) or hydrogel after polymerization, a dried substance or powder substance. An addition amount of the water-soluble resin or the water-absorbing resin is preferably 0 to 50% by weight, more preferably 0 to 20% by weight, particularly preferably 0 to 10% by weight, and most preferably 0 to 3% by weight, relative to the monomer. An addition amount of the foaming agents, surfactant and additives is preferably 0 to 5% by weight, and more preferably 0 to 1% by weight, relative to the monomer.

In addition, when a chelating agent, hydroxycarboxylic acid or a reducing inorganic salt is used, a use amount thereof is preferably 10 to 5000 ppm by weight, more preferably 10 to 1000 ppm by weight, still more preferably 50 to 1000 ppm by weight, and particularly preferably 100 to 1000 ppm by weight, relative to the water-absorbing resin. Among these, the chelating agent is preferably used. By using the chelating agent, color stability (color stability in storing at high temperature and high humidity for a long period of time) or urine resistance (prevention of gel deterioration) of a water-absorbing resin can be enhanced. As the chelating agent, those exemplified in U.S. Pat. No. 6,599,989 or WO 2008/090961 pamphlet can be applied. Among them, an aminocarboxylic acid-based metal chelating agent, a polyvalent phosphate compound may be preferably used.

In the present invention, when acrylic acid (or salt thereof) is used as a main component, a hydrophilic or hydrophobic unsaturated monomer other than acrylic acid (or salt thereof) (hereafter may also be referred to as "other monomer") may be contained. Such other monomer is not especially limited, and for example, methacrylic acid, maleic acid (anhydride), 2-(meth)acrylamide-2-methylpropane sulfonic acid, (meth)acryloxyalkane sulfonic acid, N-vinyl-2-pyrrolidone, N-vinylacetamide, (meth)acrylamide, N-isopropyl (meth)acrylamide, N,N-dimethyl (meth)acrylamide, 2-hydroxyethyl (meth)acrylate, methoxy polyethylene glycol (meth)acrylate, polyethylene glycol (meth)acrylate, stearyl acrylate and salts thereof may be included. When such other monomer is used, use amount thereof is not especially limited, as long as desired characteristics should not be impaired. It is preferably equal to or lower than 50% by weight, and more preferably 0 to 20% by weight, relative to weight of total monomers.

(b) Cross-Linking Agent (Internal Cross-Linking Agent)

In the present invention, it is particularly preferable to use a cross-linking agent (hereafter referred to also as "an internal cross-linking agent") in view of water absorbing characteristics. Use amount of the internal cross-linking agent is, in a property aspect, preferably 0.001 to 5% by mole, more preferably 0.005 to 2% by mole, still more preferably 0.01 to 1% by mole, and particularly preferably 0.03 to 0.5% by mole, relative to the monomer excluding the cross-linking agent.

The internal cross-linking agent which can be used is not especially limited. For example, cross-linking agents capable of being polymerized with acrylic acid, cross-linking agents capable of being reacted with a carboxylic group, cross-linking agents having both capabilities and the like can be exemplified. Specifically, as the polymerizable cross-linking agent, compounds having at least two polymerizable double bonds in its molecule, such as N, N'-methylenebisacrylamide, (poly)ethylene glycol di(meth)acrylate, (polyoxyethylene) trimethylolpropane tri(meth)acrylate, poly(meth)allyoxy alkane can be exemplified. In addition, as the reactable cross-linking agent, covalent cross-linking agents such as polyglycidyl ether (ethylene glycol diglycidyl ether or the like), polyhydric alcohol (propanediol, glycerin, sorbitol or the like), and cross-linking agents having ion binding property, such as polyvalent metal compounds including aluminum can be exemplified. Among these, in an aspect of water absorbing characteristics, cross-linking agents capable of being polymerized with acrylic acid may be preferably used, and in particular, acrylate-based, allyl-based, and acrylamide-based polymerizable cross-linking agents may be suitably used. These internal cross-linking agents may be used alone as one kind, or may be used in combination of two or more kinds.

(c) Polymerization Initiator

The polymerization initiator which can be used in the present invention may be selected as appropriate depending on polymerization. As such a polymerization initiator, for example, photodecomposition-type polymerization initiators, thermal decomposition-type polymerization initiators, redox-type polymerization initiators or the like can be exemplified. Use amount of the polymerization initiator is preferably 0.0001 to 1% by mole, and more preferably 0.001 to 0.5% by mole, relative to the monomer.

As the photodecomposition-type initiator, for example, benzoin derivatives, benzyl derivatives, acetophenone derivatives, benzophenone derivatives, azo compounds or the like may be exemplified. In addition, as the thermal decomposition-type initiator, for example, persulfates (such as sodium persulfate, potassium persulfate, ammonium persulfate), peroxides (such as hydrogen peroxide, t-butylperoxide, methyl ethyl ketone peroxide), azo compounds (such as 2,2'-azobis (2-amidinopropane) dihydrochloride, 2,2'-azobis[2-(2-imidazoline-2-yl)propane]dihydrochloride) or the like may be exemplified.

As the redox-type polymerization initiator, for example, a system by using in combination the persulfate or the peroxide with a reducing compound such as L-ascorbic acid and sodium hydrogen sulfite may be exemplified. In addition, combination of the photodecomposition-type initiator and the thermal decomposition-type initiator may be also preferably included.

(d) Polymerization Method

The polymerization method relevant to the embodiment of the present invention may be performed, in view of performance or polymerization control, usually by aqueous solution polymerization or reversed phase suspension polymerization. Preferably, it may be performed in aqueous solution polymerization, and still more preferably may be performed in continuous aqueous solution polymerization. Since a water-absorbing resin conventionally obtained by aqueous solution polymerization or continuous aqueous solution polymerization has an irregular particle shape, enhancement of liquid permeability has been difficult. On the other hand, in the present invention, liquid permeability can be enhanced predominantly, even in the case of an irregular particle.

As a preferable embodiment of the continuous aqueous solution polymerization, for example, continuous kneader polymerization (described in U.S. Pat. No. 6,987,151, U.S. Pat. No. 6,710,141), and continuous belt polymerization (described in U.S. Pat. No. 4,893,999, U.S. Pat. No. 6,241,928, US 2005/215734 A1) may be exemplified. By the continuous aqueous solution polymerizations, although a water-absorbing resin can be produced in high productivity, in the case of scale up, deflection of property (increase in standard deviation) has tended to be observed. The present invention can solve such a problem.

Because the present invention can provide a monomer having excellent stability even in polymerization in such a high concentration or at such a high temperature, and also can provide a water-absorbing resin with high whiteness, the present invention can exert effects more significantly under such conditions. Such polymerization initiated at high temperature has been exemplified in U.S. Pat. No. 6,906,159 and U.S. Pat. No. 7,091,253 or the like. In the present invention, however, production in an industrial scale can be easily attained, because the method of the present invention is superior also in monomer stability before polymerization.

Although the polymerizations may be performed even under air atmosphere, in view of improved coloring, it is preferable to be performed under inert gas atmosphere such as nitrogen and argon (for example, having an oxygen concentration of equal to or lower than 1% by volume). In addition, it is also preferable that, after dissolved oxygen in a monomer or a monomer-containing solution is sufficiently substituted with inert gas (for example, to an oxygen concentration of below 1 mg/L), the monomer or the monomer-containing solution is used for polymerization. Even in such degassing, monomer stability is superior and a water-absorbing resin with higher property and higher whiteness can be provided, without generating gelling before polymerization.

(2) Gel Fine Pulverization Step

The hydrogel cross-linked polymer (hydrogel) obtained in the polymerization step may be dried as it is, or the hydrogel may be crushed in a particulate shape by using, as needed, a crushing machine (a kneader, a meat chopper or the like) during the polymerization or after the polymerization. Specifically, the present method may comprise a fine pulverization step of the hydrogel (hereafter referred to also as "gel crushing") between the polymerization step by continuous belt polymerization or continuous kneader polymerization, and the drying step.

A temperature of the hydrogel in the gel crushing may be maintained at or raised to preferably 40 to 95° C., more preferably 50 to 80° C., in view of its properties. A resin solid content of the hydrogel is not especially limited. In view of its properties, it is preferably 10 to 70% by weight, more preferably at 15 to 65% by weight, and still more preferably 30 to 55% by weight. To the hydrogel, water or a polyhydric alcohol, a mixed solution of water and the polyhydric alcohol, a solution where a polyvalent metal is dissolved in water, or steam thereof may be added.

A weight average particle diameter (as specified by sieve classification) of the particulate hydrogel after the gel crushing is preferably in the range of 0.2 to 10 mm, more preferably 0.3 to 5 mm, and particularly preferably 0.5 to 3 mm. In addition, a ratio of the particulate hydrogel having a particle diameter of equal to or larger than 5 mm is preferably 0 to 10% by weight, and more preferably 0 to 5% by weight, relative to the whole amount. When the weight average particle diameter of the particulate hydrogel is within this range, drying can be performed efficiently, which is preferable. As used herein, the particle diameter of the particulate hydrogel can be determined by classification with a sieve having a specified mesh size, similarly as in particle diameter of the water-absorbing resin after the pulverization step. In addition, a weight average particle diameter of the particulate hydrogel can be also determined similarly as in weight average particle diameter (D50) to be described later. However, because it is difficult to subject the particulate hydrogel to dry-type classification operation, it is measured using a wet-type classification method described in JP-A-2000-63527, paragraph [0091].

(3) Drying Step

A drying method is not especially limited, as long as the hydrogel cross-linked polymer obtained in the polymerization step, or the particulate hydrogel obtained in the gel fine pulverization step can be dried to a desired resin solid content. For example, various drying methods may be adopted, such as heating drying, hot air drying, reduced pressure drying, infrared ray drying, microwave drying, drum dryer drying, azeotropic dehydration with a hydrophobic organic solvent, high humidity drying using high temperature steam. Among these, hot air drying is preferable, hot air drying using a gas having a dew-point temperature of 0 to 100° C. is more preferable, and hot air drying using a gas having a dew-point temperature of 20 to 90° C. is still more preferable.

In addition, although a drying temperature is not especially limited, it is preferably in the range of 100 to 300° C., and more preferably in the range of 150 to 250° C. In order to satisfy both high property and whiteness degree of the resultant water-absorbing resin, it is preferable that drying temperature is 165 to 230° C. and drying time is within 50 minutes, and drying time of 20 to 40 minute is particularly preferable. Drying temperature or drying time outside this range could incur decrease in absorption against non-pressure (CRC), increase in extractables, decrease in whiteness degree of the water-absorbing resin, which is not preferable.

A resin solid content determined from a reduced amount of dried hydrogel (weight change in heating 1 g of a powder or particle at 180° C. for 3 hours) is preferably equal to or higher than 80% by weight, more preferably 85 to 99% by weight, still more preferably 90 to 98% by weight, and particularly preferably 92 to 97% by weight. In the drying step, a dried substance with a dried weight adjusted within the above range can be obtained.

In order to attain decrease in residual monomers in the water-absorbing resin obtained, prevention of gel deterioration (urine resistance) and prevention of yellowing, it is preferable to shorten a time from completion of polymerization to start drying. That is, irrespective of presence or absence of the gel fine pulverization step, it is preferable to make a time from completion of polymerization to start drying within 1 hour, more preferably within 0.5 hour, and still more preferably within 0.1 hour. In addition, during this period, it is preferable to control a temperature of the hydrogel cross-linked polymer at 50 to 80° C., and more preferably at 60 to 70° C. By controlling the temperature within this range, decrease in residual monomers or low coloring can be attained.

(4) Pulverization Step

A pulverization method is not especially limited, as long as a dried substance obtained in the drying step can be pulverized. Conventionally known pulverization machines can be used, for example, a roll mill, a hammer mill, a roll granulator, a jaw crusher, a gyratory crusher, a cone crusher, a roll crusher, a cutter mill or the like. Among these, in view of easy control of particle size, it is particularly preferable to use a roll mill or a roll granulator in multiple stages.

By the pulverization step, the dried substance obtained in the drying step is pulverized, to obtain a pulverized dried substance (a pulverized water-absorbing resin powder in irregular shape). Because properties of the water-absorbing resin powder enhances by said pulverization step, the pulverization step may be applied suitably.

A weight average particle diameter (D50) of the water-absorbing resin powder obtained by the pulverization step, is preferably 200 to 600 μm, more preferably 200 to 550 μm, still more preferably 250 to 500 μm, and particularly preferably 350 to 450 μm. In addition, the less particles below 150 μm is the better. A content of the particles below 150 μm is usually preferably 0 to 5% by weight, more preferably 0 to 3% by weight, and particularly preferably from 0 to 1% by weight. Still more, the less particles over 850 μm is the better. A content of the particles over 850 μm is usually preferably 0 to 5% by weight, more preferably 0 to 3% by weight, and particularly preferably from 0 to 1% by weight. Logarithm standard deviation ($\sigma\zeta$) of particle size distribution is preferably 0.25 to 0.45, and more preferably 0.30 to 0.40. These values can be measured using standard sieves, by a method, for example, described in WO 2004/069915 or EDANA-ERT420.2-02 ("PSD"). In addition, in the present invention, ratio of the particles in the range of 150 to 850 μm is preferably equal to or more than 95% by weight, and more preferably equal to or more than 98% by weight (the upper limit is 100% by weight), relative to the total amount. It is preferable that the dried substance or the powder substance having this ratio is surface cross-linked. In addition, particle size before the surface cross-linking can be applied to that after the surface cross-linking, and to that of a final product.

(5) Classification Step

The present step is a step for adjustment to specified particle size (weight average particle diameter, particle diameter distribution or the like) to enhance property of the water-absorbing resin. The particle size may be adjusted as appropriate in the polymerization step (in particular, reversed phase suspension polymerization), the pulverization step, the granulation step, the fine powder recovery step, or the like, without limiting to the present classification step. Hereafter, the particle size is specified by a standard sieve (JIS Z8801-1 (2000)).

In the present invention, it may be enough that the classification step is performed at least once (at one place) in the whole steps. However, twice (at two places) or more classification steps are preferably performed in the whole steps, and the classification step is performed still more preferably at least once (at one place) before or after the surface cross-linking step. As needed, 3 to 6 times of the classification steps may be performed.

(a) Sieve Classification

The water-absorbing resin powder obtained in the pulverization step may be classified, in particular, sieve classified before surface cross-linking step or after surface cross-linking step which will be described later. By the classification step, a classified substance (water-absorbing resin powder) having a desired particle size can be obtained. Preferably, the classification step is performed before and after the surface cross-linking step. By performing the classification step before the surface cross-linking step, the particle size of a final product can be adjusted within a desired range, which is preferable. By performing the classification step after the surface cross-linking step to classify and remove or crush, after the surface cross-linking step, aggregated particles having outside the desired particle size which generate in mixing the surface cross-linking agent or in heat treatment, or fine particles having outside the desired particle size which generate by physical or mechanical fracture in these steps, the water-absorbing resin with superior performance can be produced, which is preferable.

The sieve classification method may be exemplified, for example, in U.S. Pat. No. 6,164,455 specification, WO 2006/074816 pamphlet, WO 2008/037672 pamphlet, WO 2008/037673 pamphlet and WO 2008/037675 pamphlet.

(b) Elimination of Electricity and Classification

The present invention is characterized in eliminating electricity in the classification step (preferably in the sieve classification step). By performing such electrical elimination, property, in particular liquid permeability (for example, SFC) of the surface cross-linked water-absorbing resin can enhance. Such effect can be exerted significantly in production of the water-absorbing resin with high liquid permeability, or in industrial continuous production, in particular in production of the water-absorbing resin with SFC of equal to or higher than 10 ($\times 10^{-7} \cdot cm^3 \cdot s \cdot g^{-1}$), or in performing continuous production for 24 hours or more in a rate of equal to or higher than 1 ton/hr, rather than in a small scale of a laboratory level.

(Method for Eliminating Electricity)

The method of the present invention essentially comprises eliminating electricity in the classification step. The electrical elimination may be performed for at least one of a classification apparatus, a water-absorbing resin and a sieve. Because these three items contact each other in the classification step, electricity can be eliminated for any one of them. Electricity is preferably eliminated for a classification apparatus and/or a sieve itself.

As the method for eliminating electricity, for example, the following methods (A) to (C) can be applied. The present invention, however, is not restricted to the methods.

(A) Antistatic brush: Electricity is eliminated from a sieve surface where static electricity generates, (B) Ionization air flow (ion generation brush): Electricity is eliminated by ion generation by applying high voltage, (C) Grounding (earth): Static electricity generated in a rotation substance, a rotation axis, a rotation body, or an apparatus is eliminated.

When the (A) antistatic brush is used, a self-discharging method which makes a little space between the antistatic brush and a charged substance may be adopted. Alternatively, a grounding leakage method which comprises contacting a grounded (earthed) antistatic brush with a charged substance to take out and eliminate static electricity accumulated as leak current may be adopted. As concrete examples of the antistatic brush, those produced with stainless fiber, carbon fiber, amorphous fiber, chemical fiber, plant fiber, animal hair and the like may be preferably cited. A wire diameter thereof is usually preferably 1 to 100 μm, and more preferably 5 to 20 μm. In addition, a wire length thereof is usually preferably 1 to 100 mm, and ultra fine processing of stainless is more preferable.

When the (B) ionization air flow (ion generation brush) is used, the ion generation brush which can be used may include an electrical elimination apparatus (ionizer), for example. In such an electrical elimination method, ion is generated in air or in another gas, and electrification charge is neutralized with the ion. Therefore, the electrical elimination apparatus may be also called "an ionizer". Specifically, using the electrical elimination apparatus (the ionizer), amount of electrostatic charge and electrification charge of the classification apparatus or the water-absorbing resin may be measured, and the opposite charge against plus charge or minus charge may be given to make an electrically neutral state. In this case, both of optimal electrical elimination corresponding to an electrification charge state of an object substance and ion balance control may be satisfied. Electrification charge amount of the object substance may be determined by measuring ion current using an ion current detection circuit in a controller. In this way, the method (B), which comprises electrically neutralize with a charge with reversed polarity to completely deactivate static electricity, is a preferable method for the water-absorbing resin.

When the (C) grounding is used, it is a method which comprises electrically connecting a building or a mount, where the classification apparatus is installed, with the ground showing the following earth resistance, to contact the charged substance with the apparatus, and to take out accumulated static electricity as leak current. Because this method is simple and the whole classification apparatus act as an electrical elimination apparatus, and thus provides high effects, it is one of the preferable methods for the water-absorbing resin.

The leak current taken out in such electrical elimination flows to the earth through grounding (earth) showing the following earth resistance. That is, electrical elimination is preferably performed using grounding showing the following earth resistance in the classification step of the present invention.

(Earth Resistance)

The term "earth resistance" is referred to as a resistance value against current flowing from an earth electrode buried in the soil for grounding to the earth. As for a measurement method, the earth resistance may be measured using a commercially available earth resistance meter. A preferable range of the earth resistance is preferably equal to or lower than 100Ω, more preferably equal to or lower than 10Ω, and still more preferably equal to or lower than 5Ω. The lower limit of the earth resistance is not especially limited, and the smaller is the better, however, usually equal to or higher than 1Ω.

(c) Classification Apparatus
(Classification Mesh)

In the Present Invention, the Water-Absorbing Resin powder is preferably classified using a classification mesh.

As the classification mesh, various standard sieves may be exemplified, for example, in JIS, ASTM, TYLER or the like. These sieves may be a plate sieve or a mesh sieve. The shape of the mesh sieve may be selected as appropriate with reference to JIS Z8801-1 (2000) or the like. Sieve mesh size of the standard sieves is preferably 10 μm to 100 mm, still more preferably 20 μm to 10 mm, and one or more kinds of the sieves, in particular metal sieves, are preferably used.

The sieve classification may classify only the upper parts, or only the lower parts. The upper and lower parts are preferably classified at the same time. That is, a plurality of the sieves are preferably used at the same time, and still more preferably, in view of enhanced property, sieves with at least three kinds of sieve mesh size are used. As such a method, as well as the predetermined sieves for the upper parts and the lower parts, an intermediate sieve or an upper sieve is preferably used. A suitable sieve mesh size of the sieve may be determined as appropriate depending on desired particle size of the water-absorbing resin, and is thus not especially limited. For example, the upper limit of the sieve mesh size of the sieve is preferably 300 to 1000 μm, more preferably 500 to 850 μm, and still more preferably 600 to 710 μm. The lower limit of the sieve mesh size of the sieve is preferably 106 to 225 μm, more preferably 150 to 225 μm. As needed, an intermediate sieve or an upper sieve may be added as appropriate at the middle or upper part of the desired particle size of water-absorbing resin.

(Classification Apparatus)

The Classification Apparatus to be Used in the Present invention is not especially limited, as long as it has a sieving mesh surface, and may include, for example, those classified to a vibrating screen and a shifter. The vibrating screen may include inclined type, Low-head shape, Hum-mer, Rhewum, Ty-Rock, Gyrex and Eliptex or the like. The shifter may include Reciprocating type, Exolon-grader, Traversator-sieb, Sauer-meyer, Gyratory shifter, gyro-shifter and Ro-tex screen or the like. They are more finely sorted based on movement type (circle, ellipse, straight line, arc, pseudo-ellipse, spiral, helix-like) of mesh surface, vibration system (free vibration, forced vibration), driving method (eccentric axis, unbalanced weight drop, electromagnet, impact), inclination (horizontal system, inclined system) of the mesh surface, installation method (floor-type, hanging-type) or the like.

Among these, in view of effects by the present invention, a classification apparatus that moves the sieve mesh surface in a helical direction by combination of radial inclination (inclination of a mesh screen which disperses a material from the center to the peripheral) or tangential inclination (inclination of a mesh screen which controls a discharging speed on the mesh), like a vibration-type (tumbler shifter, Tumbler-Screening machines) is preferably used.

(Classification Vibration)

A sieve classification apparatus suitable for the classification method according to the present invention is not especially limited. A flat surface classification method is preferably used, and a tumbler-type sieve classification apparatus is particularly preferable. This sieve classification apparatus is typically vibrated to support classification. Vibration is performed, preferably, in a degree that a product to be classified is guided in spiral direction (helical direction) on the sieve. This forced vibration has typically an eccentric amount of 10 to 100 mm, and preferably 25 to 40 mm, and a rotation number of 60 to 600 rpm, and preferably 100 to 400 rpm.

(Guide)

In the present invention, a sieve of the classification apparatus has preferably a guide of the water-absorbing resin powder. By such a guide, more efficient classification can be attained. Such a guide apparatus serves to guide the water-absorbing resin powder to the center of the sieve. A length thereof may be determined to about 5 to 40% of the diameter.

(Material and Surface Roughness)

A material of the sieve apparatus is not especially limited, and can be selected as appropriate from a resin, a metal or the like. However, as compared with a sieve coated with a resin, exemplified in JP-A-11-156299, a metallic sieve including a contact surface with the water-absorbing resin is preferably used, and a stainless sieve is particularly preferably used. In this case, effects by the present invention can be exerted more significantly. By mirror finishing of the stainless steel, property can enhance still more significantly. The stainless steel may include SUS304, SUS316, SUS316L or the like.

From view of enhanced property, the inner surface of the sieve apparatus to be used in the classification step of the present invention is preferably controlled to have a surface roughness (Rz), specified by JIS B 0601-2001, of equal to or smaller than 800 nm. The inner surface of the sieve apparatus may be smoothened so as to give a surface roughness (Rz) of preferably equal to or smaller than 150 nm, more preferably equal to or smaller than 100 nm, and particularly preferably equal to or smaller than 50 nm. The surface roughness (Rz) means a maximum of the maximal height (μm) of the surface unevenness. Although the lower limit of the surface roughness (Rz) is 0 nm, it may be about 10 nm and still more about 20 nm, because there is no significant difference even in about 10 nm. Other surface roughness (Ra) is also specified by JIS B 0651-2001. Ra is preferably equal to or smaller than 100 nm, more preferably equal to or smaller than 50 nm, and particularly preferably equal to or smaller than 5 nm. The surface roughness can be measured with a stylus type surface roughness meter in accordance with JIS B 0651-2001. In addition, the surface roughness can be measured with a light wave interference-type surface roughness meter in accordance with JIS B 0652-2002.

(Number of the Apparatuses)

In the production method of the present invention, in view of enhanced property and stabilization of the water-absorbing resin, the polymerization step is preferably performed by continuous belt polymerization or continuous kneader polymerization, and a plurality of the classification steps are preferably performed in parallel, for each line in the polymerization steps. In this case, "a line" as used in the present invention means a line proceeding every step from a raw material (monomer) to a final product, a hydrogel cross-linked polymer, a water-absorbing resin powder, a water-absorbing resin. When a line is divided into two, it is referred to as "two lines". Therefore, "two or more lines" indicate that two or more units of the apparatuses are arranged in parallel in the same step and operated at the same time or alternately.

In the present invention, when each step is performed in two or more lines, the upper limit is about ten lines, although not especially limited. Among them, two to four lines are preferable, two to three lines are more preferable and two lines are still more preferable. By setting the line number in this range, property of the resultant water-absorbing resin can be enhanced. On the other hand, when the line number (that is, number of divided lines) is unduly large, effects by the present invention could not be obtained, as well as operation would become complicated, and would be uneconomical in view of cost.

In the present invention, the hydrogel cross-linked polymer or the water-absorbing resin powder may be divided in two or more lines in the step including and subsequent to the drying step, and ratio of amount thereof to be divided may be determined in each step, and is not especially limited. For example, in dividing into two lines, 4:6 to 6:4 is preferable, 4.5:5.5 to 5.5:4.5 is more preferable, 4.8:5.2 to 5.2:4.8 is further preferable, and 5:5 is particularly preferable. In dividing into three or more lines, it is preferable that ratio of the maximal amount and the minimal amount, to be divided to n pieces, is within the above range. It should be noted that, division operation may be of continuous type or batch type, and ratio of amount thereof to be divided is specified by average amount in a predetermined time.

In the present invention, the number of lines in the classification step is not especially limited, and the number of lines may be arbitrarily selected. In consideration of plant construction cost, running cost or the like, one line or two lines is preferable, and two lines are more preferable.

In one embodiment of the present invention, one line may be used from the polymerization step prior to the classification step, and two or more lines may be used in the classification step for the line. According to such an embodiment, liquid permeability (for example, SFC or GBP) or absorption against pressure (AAP) can be enhanced more, and a water-absorbing resin with more superior performance can be produced.

Two or more lines may be preferably used in the pulverization step or the surface cross-linking step and the like including and subsequent to the drying step, as well as in the classification step. To be specific, two lines may be preferably used in the classification step for one line in the polymerization step, and most preferably, two or more lines may be most preferably used in all of the pulverization step, the surface cross-linking step and the like.

When a plurality of apparatuses is installed in parallel (in two or more lines), treatment capability of each apparatus may be reduced. For example, although price of an apparatus is not halved even by downsizing treatment capability of the apparatus to ½, property of the resultant water-absorbing resin can be enhanced, and ratio of out of specifications decreases, which leads to cost down.

US-A-2008/0227932 discloses a method wherein a polymerization step is performed in two lines, and the following steps are performed in one line. US-A-2007/0149760 discloses a method for "connecting in series" a stirring drying apparatus with a heat treatment machine in the surface cross-linking step. WO 2009/001954 discloses a technology for "connecting in series" a belt polymerization apparatus. On the contrary, in the present invention, "(substantially the same) apparatuses are arranged in parallel" in a specified step including and subsequent to the drying step, for one unit of a polymerization apparatus. By this means, enhanced property and stabilization of the water-absorbing resin equal to or more than conventional level can be attained.

(Method for Division)

In the present invention, when a step of the classification step or the surface cross-linking step or the like is performed in two or more lines, the hydrogel cross-linked polymer or the water-absorbing resin powder such as the dried substance thereof may be preferably divided by the following methods.

As the method for division to be used, the following methods (1) to (3) can be adopted to the water-absorbing resin powder after drying, for example.

(1) A method for dividing the water-absorbing resin powder after placing in a hopper.

In this method, a metering feeder may be used. As the metering feeder, a circle feeder, a screw feeder or the like may be used suitably.

(2) A method for dividing the water-absorbing resin powder in transporting to a plurality of hoppers by pneumatic transportation.

(3) A method for dividing the water-absorbing resin powder in transporting by falling (for example, free falling).

In this method, a two-divider or a three-divider having protrusions or weirs and the like may be used. JIS riffle sampler (two-divider) has a structure that it is partitioned to many small compartments, to which a charged sample is sorted in two directions alternately.

For the hydrogel cross-linked polymer after polymerization, the following methods (4) to (6) or a combination of these methods can be adopted.

(4) A method for dividing the hydrogel cross-linked polymer obtained with a kneader or a meat chopper, in transportation by falling (for example, free falling).

In this method, a two-divider or a three-divider having protrusions or weirs and the like may be provided at the outlet of the kneader or the meat chopper.

(5) A method for dividing the hydrogel cross-linked polymer with a metering feeder.

(6) A method for cutting a sheet-like hydrogel cross-linked polymer obtained by belt polymerization.

Among these, in view of quantitative supplying property, the methods (1) to (3) are preferable, and the method (1) is more preferable. A preferable ratio of the water-absorbing resin powder or the hydrogel cross-linked polymer to be divided is as described above.

(d) Classification Conditions (Heating Temperature)

In the present invention, a classification apparatus may be preferably used in a heated state and/or in a state of keeping the heat, as well as elimination of electricity.

The term "heating" as used in the present invention indicates to give heat positively. Therefore, a heated state may include a case where heat is given to a classification apparatus in an initial state to raise its temperature up to a certain temperature, and heat is not given hereafter; or a case where heat is given to a classification apparatus not only in an initial state but also constantly, or the like. On the other hand, "to keep heat" indicates to retain heat without giving any heat, that is, to repress decrease in temperature.

In order to make a classification apparatus in a heated state and/or in a state of keeping the heat, atmospheric temperature where the classification apparatus is installed may be raised or the like. A preferable classification apparatus is a dry-type classification apparatus provided with a heating means and/or a heat-keeping means.

The classification apparatus (temperature of a sieve to be used) is preferably used at a temperature in the range of about 40 to 80° C., in more preferably about 45 to 60° C. The temperature of below 40° C. would decrease property. On the other hand, the temperature over 80° C. would not only provide effect similar to that obtained at equal to or lower than 80° C., but would be also economically disadvantageous due to making higher temperature, and may give adverse influence on classification efficiency.

The classification apparatus is preferably used at a temperature of not lower than by 20° C. relative to a temperature of the water-absorbing resin powder. More preferably, it is a temperature of not lower than by 10° C. relative thereto. In order to ensure fluidity in handling the water-absorbing resin powder in an industrial scale, the water-absorbing resin powder may be heated to a temperature equal to or higher than room temperature, for example, in the range of about 40 to 100° C., and more preferably 50 to 80° C.

(Reduced Pressure)

The classification step is preferably performed in a reduced pressure state to enhance property after surface cross-linking. As used herein, "a reduced pressure state" means pressure lower than atmospheric pressure, and represented by a "degree of reduced pressure" as a positive (plus) value. That is, when atmospheric pressure is standard atmospheric pressure (101.3 kPa), a "degree of reduced pressure of 10 kPa" means a pressure of 91.3 kPa.

In the present invention, the lower limit of the degree of reduced pressure is preferably over 0 kPa, more preferably equal to or higher than 0.01 kPa, and more preferably equal to or higher than 0.05 kPa. In view of preventing a powder substance from floating up in the classification apparatus, and reducing cost of an exhaustion apparatus or the like, the upper limit of the degree of reduced pressure is preferably equal to or lower than 10 kPa, more preferably equal to or lower than 5 kPa, and still more preferably equal to or lower than 2 kPa. Preferable range of the degree of reduced pressure can be selected arbitrary between the lower limit and the upper limit.

(Air Flow)

In the classification step, a gas flow, particularly preferably air, may be preferably passed through the water-absorbing resin powder. The amount of the gas is typically 0.1 to 10 $m^3/h$, preferably 0.5 to 5 $m^3/h$, and particularly preferably 1 to 3 $m^3/h$, per 1 $m^2$ of sieve area. In this case, gas volume may be measured under standard conditions (for example, under such conditions as of 25° C. and 1 bar). Particularly preferably, gas flow is heated typically at equal to or higher than 40° C., preferably equal to or higher than 50° C., more preferably equal to or higher than 60° C., still more preferably equal to or higher than 65° C., and particularly preferably equal to or higher than 70° C., before being charged into the sieve classification apparatus. Temperature of gas flow may be usually equal to or lower than 120° C., preferably equal to or lower than 110° C., more preferably equal to or lower than 100° C., still more preferably equal to or lower than 90° C., and particularly preferably equal to or lower than 80° C.

Water content of gas flow may be typically equal to or lower than 5 g/kg, preferably equal to or lower than 4.5 g/kg, more preferably equal to or lower than 4 g/kg, still more preferably equal to or lower than 3.5 g/kg, and particularly preferably equal to or lower than 3 g/kg. Gas flow with lower water content can be produced, for example, by cooling gas flow with high water content to condense a corresponding amount of water.

Dew point of air flow (gas flow) may be preferably equal to or lower than 20° C., more preferably equal to or lower than 15° C., still more preferably equal to or lower than 10° C., and particularly preferably equal to or lower than 0° C. Although the lower limit of the dew point is not especially limited, it is preferably about −5° C., in consideration of cost performance.

(Dew Point of Atmosphere)

Dew point of atmosphere (air) where the classification step is performed is preferably equal to or lower than 20° C., more preferably equal to or lower than 15° C., still more preferably equal to or lower than 10° C., and particularly preferably equal to or lower than 0° C. Although the lower limit of the dew point is not especially limited, it is preferably about −5° C., in consideration of cost performance.

As a method for controlling the dew point, gas, preferably air may be dried as appropriate. A method for using a membrane dryer, a method for using a cooling adsorption-type dryer, a method for using a diaphragm dryer, and a method for using these in combination may be included. When the adsorption-type dryer is used, it may be of a heating regeneration-type, or may be of a non-heating regeneration-type, or may be of a non-regeneration-type.

(e) Water-Absorbing Resin Powder

The water-absorbing resin powder before surface cross-linking, which is capable of exerting effects by the present invention more significantly, may have an absorption against non-pressure (CRC) of preferably in the range of 20 to 100 g/g, more preferably 25 to 50 g/g, an still more preferably 27 to 45 g/g, and a solid content [in other words, 100−(water content)] of preferably in the range of 85 to 99.9% by weight, more preferably 90 to 99.9% by weight, and still more preferably 95 to 99.9% by weight. The solid content outside the range may decrease properties.

(6) Surface Cross-Linking Step

The present step is a step for surface cross-linking the water-absorbing resin powder obtained in the above steps (the drying step, the pulverization step, the classification step). In the present description, "surface cross-linking" means to cross-link the surface or the neighborhood of the surface of the water-absorbing resin powder. The "surface or neighborhood of the surface" indicates a part of the surface layer with a thickness of usually equal to or less than several tens µm, or a part of the surface layer with a thickness of equal to or less than 1/10 of whole thickness. The thickness can be determined as appropriate depending on objects. In the production method of the present invention, liquid permeability or absorption against pressure can be enhanced by surface cross-linking.

The surface cross-linking method is not especially limited. For example, a method for cross-linking the surface of a water-absorbing resin powder using a surface cross-linking agent (Japanese Patent No. 2530668) may be exemplified. In particular, surface cross-linking under heat at a high temperature may be suitably applied.

(a) Surface Cross-Linking Agent

As the surface cross-linking agent which can be used in the present invention, various organic or inorganic surface cross-linking agents can be exemplified, and organic surface cross-linking agents are preferably used. As the organic surface cross-linking agent, polyhydric alcohol compounds such as mono-, di-, tri-, or tetra-propylene glycol, 1,3-propanediol, glycerin, 1,4-butanediol, 1,3-butanediol, 1,5-pentanediol, 1,6-hexanediol, sorbitol or the like; epoxy compounds such as ethylene glycol diglycidyl ether, glycidol or the like; polyvalent amine compounds or condensed compounds thereof with halo-epoxy compound, oxazoline compounds; (mono-, di-, or poly-) oxazolidinone compounds; alkylene carbonate compounds such as ethylene carbonate or the like; oxetane compounds; cyclic urea compounds such as 2-imidazolidinone or the like may be included, for example. Among these, surface cross-linking agents having dehydration esterification reactivity, selected from polyhydric alcohol compounds, alkylene carbonate compounds, and oxazolidinone compounds can be used particularly preferably. These organic surface cross-linking agents may be used alone or two or more kinds may be used in combination.

Because the surface cross-linking agent having dehydration esterification reactivity has low reactivity, it has a high safety, however, control of stable reaction is difficult on the contrary. On the other hand, in the present invention, even in continuous production using such a surface cross-linking agent having dehydration esterification reactivity, the water-absorbing resin with small variation (deflection) of property and small standard variation can be produced continuously. In more specifically, compounds exemplified in U.S. Pat. No. 6,228,930, U.S. Pat. No. 6,071,976, U.S. Pat. No. 6,254,990 or the like may be included.

As the inorganic surface cross-linking agent, salts (organic salts or inorganic salts) or hydroxides of divalent or higher, preferably trivalent or tetravalent, polyvalent metals may be exemplified. As the polyvalent metal, aluminum, zirconium or the like may be included. As the salt of the polyvalent metal, aluminum lactate, aluminum sulfate or the like may be included. These inorganic surface cross-linking agents are used at the same time with or separately from the organic surface cross-linking agent. The surface cross-linking using the polyvalent metal has been disclosed in WO 2007/121037, WO 2008/09843, WO 2008/09842, U.S. Pat. No. 7,157,141, U.S. Pat. No. 6,605,673, U.S. Pat. No. 6,620,889, US-A-2005/0288182, US-A-2005/0070671, US-A-2007/0106013, US-A-2006/0073969.

Further, by using a polyamine polymer, in particular, a polyamine polymer with weight average molecular weight of about 5000 to 1,000,000, other than the organic surface cross-linking agent, at the same time or separately, liquid permeability or the like of the water-absorbing resin may be enhanced. The polyamine polymer has been disclosed, for example, in U.S. Pat. No. 7,098,284, WO 2006/082188, WO 2006/082189, WO 2006/082197, WO 2006/111402, WO 2006/111403, WO 2006/111404 or the like.

In the present invention, in addition to the surface cross-linking agent with covalent binding property, as an organic surface cross-linking agent, a surface cross-linking agent with ion binding property, in particular, a polyvalent metal salt or a polyamine polymer may be used, or may be used in combination, in order to enhance liquid permeability. In order to enhance liquid permeability, other than the organic surface cross-linking agent, an inorganic surface cross-linking agent may be preferably used, or may be used in combination. When these various surface cross-linking agents are used in combination, they may be added to the water-absorbing resin at the same time (once), or may be added portion wise (a plurality times) separately.

An amount of the surface cross-linking agent used may be selected as appropriate depending on compounds to be used or a combination thereof. It is preferably 0.001 to 10 parts by weight, more preferably 0.01 to 5 parts by weight, relative to 100 parts by weight of the water-absorbing resin powder. When the organic surface cross-linking agent and the inorganic surface cross-linking agent are used in combination, or when the surface cross-linking agent with covalent binding property and the surface cross-linking agent with ion binding property are used in combination, the amount thereof used in combination may be within the above range. An amount of solvent used may be also selected within the following range.

(b) Mixed Solvent

When the surface cross-linking agent is used, water is preferably used. Although an amount of used water is not especially limited, it is preferably 0.5 to 20 parts by weight, and more preferably 0.5 to 10 parts by weight, relative to 100 parts by weight of the water-absorbing resin powder.

In this case, a hydrophilic organic solvent may be used. Although an amount thereof used is not especially limited, it is preferably 0 to 10 parts by weight, and more preferably 0 to 5 parts by weight, relative to 100 parts by weight of the water-absorbing resin powder.

As the hydrophilic organic solvent, alcohols such as methyl alcohol, ethyl alcohol, propyl alcohol, isopropyl alcohol, n-butyl alcohol, isobutyl alcohol, t-butyl alcohol; ketones such as acetone, methyl ethyl ketone; ethers such as dioxane, alkoxy(poly)ethylene glycol, tetrahydrofuran; amides such as $\epsilon$-caprolactam, N,N-dimethylformamide; sulfoxides such as dimethylsulfoxide; polyhydric alcohols such as ethylene glycol, diethylene glycol, propylene glycol, triethylene glycol, tetraethylene glycol, 1,3-propanediol, dipropylene glycol, 2,2,4-trimethyl-1,3-pentanediol, glycerin, 2-butene-1,4-diol, 1,3-butanediol, 1,4-butanediol, 1,5-pentanediol, 1,6-hexanediol, 1,2-cyclohexanedimethanol, 1,2-cyclohexanol, trimethylol propane, diethanol amine, triethanol amine, polyoxypropylene, pentaerythritol, sorbitol; or the like may be include, for exampled. One or more solvents may be used.

(c) Another Component

In the present step, in mixing the surface cross-linking agent solution to the water-absorbing resin powder, a water-insoluble fine particle powder substance or a surfactant may co-exist in such an amount as not to obstruct effects by the present invention. Kind of the water-insoluble fine particle powder substance or the surfactant to be used, or use amount thereof is not especially limited. The range exemplified in WO 2005/075070 pamphlet can be applied. The "in such an amount as not to obstruct effects by the present invention" means within a range preferably equal to or lower than 10 parts by weight, more preferably equal to or lower than 5 parts by weight, and still more preferably equal to or lower than 1 part by weight, relative to 100 parts by weight of the water-absorbing resin powder.

Further, in the present step, in addition to the surface cross-linking agent, as needed, an acidic substance such as an organic acid (lactic acid, citric acid, p-toluenesulfonic acid) or salt thereof, and an inorganic acid (phosphoric acid, sulfuric acid, sulfurous acid), or salt thereof, a basic substance such as sodium hydroxide and sodium carbonate, a polyvalent metal salt such as aluminum sulfate, may be used in an amount of preferably 0 to 10% by weight, further preferably 0 to 5% by weight, and particularly preferably about 0 to 1% by weight, relative to the water-absorbing resin powder.

(d) Reaction Temperature and Time

After mixing the surface cross-linking agent with the water-absorbing resin powder, the mixture may be preferably subjected to heat treatment and, as needed, subjected to cooling treatment. Heating temperature in the heat treatment is not especially limited, as long as it is a temperature at which the surface cross-linking reaction proceeds. It is preferably 70 to 300° C., more preferably 120 to 250° C., and still more preferably 150 to 250° C. Heating time is preferably within the range of 1 minute to 2 hours. In the heat treatment, a common dryer or a common heating furnace may be used, and specifically it is preferable to use a known heat treatment apparatus such as a paddle dryer or a fluid-bed, and in particular, it is preferable to use a continuous heat treatment apparatus. In the present invention, even when heating at high temperature or drying with air (hot air) is performed, which has been conventionally difficult in stabilization of property, the water-absorbing resin with stable high property can be provided. The water-absorbing resin powder after the heat treatment may be subjected to cooling treatment as needed, to stop the surface cross-linking reaction.

(e) Another Surface Cross-Linking

In the present invention, the surface cross-linking may be performed without using the surface cross-linking agent. For example, surface cross-linking by a radical polymerization initiator (for example, U.S. Pat. No. 4,783,510), surface cross-linking by activated energy rays (for example, EP-A-1506788), surface cross-linking by polymerization on the surface (for example, U.S. Pat. No. 7,201,941), or the like may also be applied to the present invention.

(7) Another Step

The water-absorbing resin after the surface cross-linking step may be preferably subjected to the classification according to the present invention. That is, the classification steps, a first classification step (the classification step 1) and a second classification step (the classification step 2), may be preferably performed before the surface cross-linking step and after the surface cross-linking step, respectively, to solve the problem of the present invention. When an aggregated substance generates in the surface cross-linking step, crushing treatment of the aggregated substance may be performed before the classification step or after the classification step.

Other than the above steps, as needed, a recycling step of evaporated monomer, a granulation step, a fine-powder removal step, a fine-powder recycling step or the like may be included. Preferably, a step of recycling fine powders of the water-absorbing resin after the classification step (a fine-powder recycling step) may be included.

(a) Fine-Powder Recycling Step

The present step is a step for returning fine powders (for example, fine powders containing particles below 150 lamas a main component, in particular, containing particles below 150 μm in an amount of equal to or more than 70% by weight) removed by classification or the like to the production step of the water-absorbing resin. Preferably, by recycling fine powders to the polymerization step or the drying step, removal and reuse of the fine powders can be attained. In the recycling step, the fine powders may be returned as themselves to the production step, or may be returned to the production step after granulation in the granulation step. A recycling method may comprises mixing fine powders in a polymerization machine, preferably a stirring polymerization machine such as a kneader, to form an uniform mixture, or separately mixing fine powders or a granulate thereof with a polymer gel after polymerization, for example, by (crushing and) mixing with a meat chopper, or mixing in a dryer. A preferable fine-powder recycling method may be exemplified in U.S. Pat. No. 6,133,193, U.S. Pat. No. 6,228,930, U.S. Pat. No. 5,455,284, U.S. Pat. No. 5,342,899, US-A-2008/0306209, for example. Amount of the fine powders can be decreased by adding the fine powders in the production step of the water-absorbing resin such as the polymerization step, the gel pulverization step, and the drying step. Although a recycling amount of the fine powders is not especially limited, it may be preferably about 1 to 30% by weight, for example, still more preferably 5 to 25% by weight, particularly preferably 8 to 20% by weight, of production amount. In addition, the fine powders may be recycled to the production step as dry powders as themselves, or by forming a gel by adding water as needed, or in particular, recycled to a monomer and/or a gel (before drying or during polymerization). By the recycling, waste amount of the water-absorbing resin can be decreased.

Further, in order to enhance effect of color stability over time or prevent gel deterioration, an additive to be described later may be used in a monomer or a polymer thereof (a hydrogel cross-linked polymer).

(b) Iron Removal Step

In the present invention, when an antistatic brush is used, a metal wire may be incorporated. The method may preferably comprise an iron removal step, more preferably an iron removal step using a magnet after the classification step. By performing the iron removal step, a metal component present in the water-absorbing resin powder can be removed. For iron removal, a permanent magnet may be used to remove a metal derived from a sieve or a brush, by passing the water-absorbing resin powder flowing continuously between the magnets.

(c) Transportation Step

Although various methods for transporting the water-absorbing resin before and after the classification step, in particular, between the classification step and the surface cross-linking step, may be used, pneumatic transportation may be preferably used. In the air transportation, from the view point that superior property of the water-absorbing resin can be maintained stably, dried air may be preferably used. The upper limit of dew point of the dried air may be usually equal to or lower than 20° C., preferably equal to or lower than −5° C., more preferably equal to or lower than −10° C., still more preferably equal to or lower than −12° C., and particularly preferably equal to or lower than −15° C. The lower limit of the dew point may be usually equal to or higher than −100° C., preferably equal to or higher than −70° C. About −50° C. may be sufficient. Further, temperature of the dried gas may be preferably 10 to 40° C., and more preferably 15 to 35° C. Surface roughness (Rz) of the inner surface of the pneumatic transportation pipeline has a similar range as surface roughness (Rz) of the inner surface of the sieving apparatus.

Other than dried gas (air), heated gas (air) may be used. In this case, although a heating method is not especially limited, gas (air) may be heated directly using a heating medium, or gas (air) to be passed may be heated indirectly by heating a transportation pipeline or a apparatus. The lower limit of temperature of the heated gas (air) may be preferably equal to or higher than 20° C., and more preferably equal to or higher than 30° C. The upper limit of the temperature of the heated gas (air) may be preferably below 70° C., and more preferably below 50° C.

As a method of controlling a dew point, gas (preferably air) may be dried as appropriate. Specifically, a method for using a membrane dryer, a method for using a cooling adsorption-type dryer, a method for using a diaphragm dryer, and a method for using these in combination may be included. When the adsorption-type dryer is used, it may be a heating regeneration-type, or may be a non-heating regeneration-type.

(8) Others (a) Production Amount

The following problem of decreased property or the like tends to become significant in the production in an industrial scale. The production method of the present invention can be controlled suitably in a large scale production. From this point of view, in the present invention, an amount of the water-absorbing resin produced per one line may be preferably equal to or higher than 1 ton/hr. The term "one line" indicates a series of production steps of the water-absorbing resin, and when the step is branched, it is specified as treatment amount in the surface cross-linking step (in one apparatus). The unit "(ton/hr)" means transportation amount (metric ton; t; ton) per 1 hour. The amount of the water-absorbing resin produced per one line may be preferably equal to or higher than 1.5 ton/hr, still more preferably equal to or higher than 2 ton/hr, and particularly preferably equal to or higher than 3 ton/hr. The upper limit of the production amount is not especially limited, and may be determined as appropriate, for example, at 10 ton/hr or the like.

[3] Property of the Water-Absorbing Resin (1) Property of the Water-Absorbing Resin The production method of the present invention may be suitably applied particularly to the case where at least three or more properties of the water-absorbing resin are controlled. Effects by controlling each property can be exerted suitably in production method for the water-absorbing resin with many functions and high properties such as preferably 4 or more, 5 or more, or 6 or more, properties. As the property to be controlled, the following may be exemplified: (a) absorption against pressure (AAP), (b) liquid permeability (SFC), (c) absorption against non-pressure (CRC), (d) Extractables, (e) residual monomers, (f) initial coloring, (g) moisture content, and further free swelling capacity (FSC), particle size distribution, pH, flow rate, density, respirable particles, dust and the like. They can be applied to production method in being highly controlled. The properties to be controlled or the methods for measuring them may be determined as appropriate, and the EDANA measuring methods and the like are applicable to the production of the water-absorbing resin with the property in the following range.

When the water-absorbing resin of the present invention is aimed at being used in hygiene materials, in particular, disposable diapers, at least one property of the following (a) to (g), still more two or more including AAP, and in particular, three or more may be preferably controlled in a desired range by the polymerization or surface cross-linking. If the following property is not satisfied, effects by the present invention may not be obtained sufficiently, or sufficient performance may not be exerted in high concentration diapers to be described later.

(a) Absorption Against Pressure (AAP)

In the water-absorbing resin obtained by the production method of the present invention, to prevent leakage in diapers, the absorption against pressure (AAP) for an aqueous 0.9% by weight sodium chloride solution under pressure of 1.9 kPa or under pressure of 4.8 kPa can be controlled, preferably to be equal to or higher than 20 (g/g), more preferably equal to or higher than 22 (g/g), and still more preferably equal to or higher than 23 (g/g), using the above polymerization as an example of attaining measures. The upper limit of the absorption against pressure (AAP) is not especially limited, and the higher is the better. In view of balance with other properties or cost, however, the upper limit of the AAP under pressure of 1.9 kPa may be about 40 (g/g), and that under pressure of 4.8 kPa may be about 30 (g/g), and still more about 28 (g/g). In the present description, unless otherwise specified, the AAP shows a value under pressure of 4.8 kPa as defined in ERT442.2-02.

(b) Liquid Permeability (SFC)

In the water-absorbing resin obtained by the production method of the present invention, in order to prevent leakage in diapers, saline flow conductivity (SFC) for a 0.69% saline solution, which is liquid permeability under pressure, can be controlled to be equal to or higher than 1 ($\times 10^{-7} \cdot cm^3 \cdot s \cdot g^{-1}$), preferably equal to or higher than 10 ($\times 10^{-7} \cdot cm^3 \cdot s \cdot g^{-1}$), more preferably equal to or higher than 50 ($\times 10^{-7} \cdot cm^3 \cdot s \cdot g^{-1}$), still more preferably equal to or higher than 70 ($\times 10^{-7} \cdot cm^3 \cdot s \cdot g^{-1}$), and particularly preferably equal to or higher than 100 ($\times 10^{-7} \cdot cm^3 \cdot s \cdot g^{-1}$), using the above polymerization as one example of attaining measures. Because the higher is the upper limit of SFC is the better, it is not especially limited. In general, however, it may be equal to or lower than 1000 ($\times 10^{-7} \cdot cm^3 \cdot s \cdot g^{-1}$), and more preferably equal to or lower than 500 ($\times 10^{-7} \cdot cm^3 \cdot s \cdot g^{-1}$).

By the production method and the enhancement method for liquid permeability of the present invention, the surface cross-linked water-absorbing resin having the above desired SFC value can be obtained.

(c) Absorption Against Non-Pressure (CRC)

In the water-absorbing resin obtained by the production method of the present invention, the absorption against non-pressure (CRC) can be controlled preferably to be equal to or higher than 10 (g/g), more preferably equal to or higher than 20 (g/g), still more preferably equal to or higher than 25 (g/g), and particularly preferably equal to or higher than 27 (g/g). The higher CRC is the better, and thus the upper limit value is not especially limited. In view of balance with other properties, however, it may be equal to or lower than 50 (g/g), more preferably equal to or lower than 45 (g/g), and still more preferably equal to or higher than 40 (g/g).

(d) Water-Soluble Content (Extractables)

The water-absorbing resin obtained by the production method of the present invention may have a water-soluble content of preferably 0 to equal to or lower than 35% by weight, more preferably equal to or lower than 25% by weight, still more preferably equal to or lower than 15% by weight, and particularly preferably equal to or lower than 10% by weight.

(e) Residual Monomers

The water-absorbing resin obtained by the production method of the present invention may have residual monomers of preferably 0 to 700 ppm by weight, more preferably 0 to 600 ppm by weight, and particularly preferably 0 to 500 ppm by weight, using the above polymerization as an example of attaining means.

(f) Initial Coloring

The water-absorbing resin obtained by the production method of the present invention may be superior in initial coloring, and for example, in Hunter Lab surface color system, L value (lightness) may be preferably equal to or higher than 85, more preferably equal to or higher than 87, and still more preferably equal to or higher than 89; b value may be preferably −5 to 10, more preferably −5 to 5, and still more preferably −4 to 4; a value may be preferably −2 to 2, more preferably −1 to 1, still more preferably −0.5 to 1, and most preferably 0 to 1. YI (yellow index) may be preferably equal to or lower than 10, still more preferably equal to or lower than 8, and particularly preferably equal to or lower than 6; and WB (white balance) may be preferably equal to or higher than 70, still more preferably equal to or higher than 75, and particularly preferably equal to or higher than 77. Further, such a water-absorbing resin may be superior also in coloring over time, and may have sufficient whiteness even at high temperature and high humidity in an acceleration test (model) for a long period of storage.

(g) Water Content

Water content of the water-absorbing resin obtained by the production method of the present invention may be preferably equal to or lower than 5% by weight, and still more preferably equal to or lower than 1% by weight. In particular, when the classification step is performed after the surface cross-linking step, the classification method of the present invention is preferable, because it can exert effects significantly for the water-absorbing resin having such low water content. Although the lower limit of the water content is not especially limited, it may be preferably equal to or higher than 0.1% by weight, and still more preferably equal to or higher than 0.5% by weight.

(2) Another Additive

The water-absorbing resin obtained by the production method of the present invention, in view of coloring over time, may further contain an additive selected from the group consisting of a chelating agent, a reducing inorganic salt and a hydroxycarboxylic acid. Acetic acid and propionic acid, as the chelating agent, may be preferably used in view of antibiotic property. The used amount thereof is as defined above.

Further, in response to objectives, the water-absorbing resin may comprise an oxidizing agent, an anti-oxidizing agent, water, a polyvalent metal compound, water-insoluble inorganic or organic powder such as silica or metal soap, a deodorant, an antibiotic agent, a polyamine polymer, pulp, thermoplastic fiber or the like in an amount of 0 to 3% by weight, and preferably 0 to 1% by weight.

(3) Applications

Although the applications of the water-absorbing resin of the present invention is not especially limited, it may be preferably used in absorbing articles such as disposable diapers, sanitary napkins, and incontinent pads. In particular, superior performance can be exerted, particularly when it was used in high concentration diapers (those where a large amount of the water-absorbing resin is used in one piece of the diapers), where odor or coloring or the like derived from raw materials of the water-absorbing resin has conventionally been a problem, or when it is used at the upper layer part of the absorbing body of the absorbing articles.

An amount (core concentration) of the water-absorbing resin in the absorbing body arbitrary containing other absorbing materials (pulp fiber and the like) in the absorbing articles may be preferably 30 to 100% by weight, more preferably 40 to 100% by weight, still more preferably 50 to 100% by weight, particularly preferably 60 to 100% by weight, far more preferably 70 to 100% by weight, and most preferably 75 to 95% by weight.

EXAMPLES

Explanation will be given below on the present invention with reference to Examples, however, the present invention should not be limited to these Examples. It should be noted that a measurement method for AAP or SFC or the like hereafter is as described above.

Example 1

A water-absorbing resin was continuously produced using a continuous production apparatus (a production capacity of about 1500 kg per one hour) of a water-absorbing resin, which has connected each other a polymerization step (static polymerization on a belt), a gel fine pulverization (crushing) step, a drying step, a pulverization step, a classification step (a classification step 1), a surface cross-linking step (a spray step of the surface cross-linking agent and a heating step), a cooling step, a particle size-adjusting step (a classification step 2), and transportation steps between each step, and permits each step performed continuously.

Specifically, an aqueous solution of partial neutralized sodium acrylate having a neutralization ratio of 75% by mole (concentration: 38% by weight) and containing 0.06% by mole (relative to the monomer) of polyethylene glycol diacrylate (average number of n (average polymerization degree)=9) as an inner cross-linking agent was prepared as a monomer aqueous solution (1). Then, the monomer aqueous solution (1) was fed continuously with a metering pump, and by blowing nitrogen gas continuously in the middle of a transportation pipeline, dissolved oxygen concentration was adjusted so as to be equal to or lower than 0.5 mg/L.

Next, to the monomer aqueous solution (1), sodium persulfate and L-ascorbic acid were further mixed continuously with a line mixing, in a sodium persulfate/L-ascorbic acid ratio of 0.14 (g)/0.005 (g) (relative to 1 mole of the monomer), and supplied to a flat steel belt having weirs provided at both ends thereof, to give a thickness of about 30 mm, to perform static aqueous solution polymerization continuously (continuous belt polymerization) at 95° C. for 30 minutes (polymerization step).

A hydrogel cross-linked polymer (2) thus obtained was subjected to fine pulverization using a meat chopper with a pore diameter of 7 mm under an atmosphere of 60° C. to give a size of about 1 mm (gel fine pulverization (crushing) step). The fine pulverized hydrogel was spread and mounted on a moving porous plate of a continuous air-flow band dryer (dew point of hot air: 30° C.) to give a thickness of 50 mm, dried at 185° C. for 30 minutes, and cooled by being exposed to open air, to obtain a dried polymer (solid content: 96% by weight, temperature: 60° C.) (drying step).

The whole resultant dried polymer was continuously supplied to a three-stage roll mill (roll gap configuration; from the top, 1.0 mm/0.70 mm/0.50 mm) to be pulverized (pulverization step). Then, the pulverized polymer was classified using an vibration-type circular sieve classification apparatus (vibration number: 230 rpm, radial inclination (gradient): 11 mm, tangential inclination (gradient): 11 mm, eccentricity amount: 35 mm, temperature of the apparatus: 55° C.) with a sieve diameter of 1600 mm having metal meshes (material: SUS304, surface roughness Rz of the inner surface of the sieve: 50 nm, surface roughness Ra: 4.8 nm) with sieve mesh size of 1000 μm, 850 μm and 150 μm, to collect particles between metal meshes of 850 μm and 150 μm, and to obtain a water-absorbing resin powder (3) containing particles with 850 μm to 150 μm in an ratio of about 98% by weight (CRC=36 g/g, solid content: 96% by weight, weight average particle diameter (D50)=450 μm, σζ=0.35). It should be noted that a stand where the sieve classification apparatus was installed was grounded with an earth resistance of 5Ω. Further, by an exhaustion apparatus installed with a bag filter, degree of reduced pressure in the sieve classification apparatus was set at 0.11 kPa, and air with a dew point of 10° C. and a temperature of 75° C. was passed at 2 m³/hr through inside the sieve classification apparatus (classification step 1).

The water-absorbing resin powder (3) thus obtained was continuously supplied constantly at 1500 kg/hr to a high speed continuous mixer (Turbulizer, 1000 rpm). A surface treatment agent solution, composed of a mixed solution of 0.3 part by weight of 1,4-butanediol, 0.5 part by weight of propylene glycol and 2.7 parts by weight of pure water relative to 100 parts by weight of the water-absorbing resin powder, was mixed by spraying with a sprayer. Then, the resultant mixture was subjected to heat treatment continuously at 198° C. for 40 minutes with a paddle dryer (surface cross-linking step). Subsequently, the mixture under heat treatment was forced to cool down to 60° C. using a similar paddle dryer (cooling step).

Further, a portion passed through a mesh with a sieve mesh size of 850 μm was classified using the same vibration-type circular sieve classification apparatus with a sieve diameter of 1600 mm as used in the above (classification step 2). A portion remained on the mesh with a sieve mesh size of 850 μm was pulverized again, and mixed with the portion passed through a mesh with a sieve mesh size of 850 μm, to obtain a water-absorbing resin (A) (water content: 1.5% by weight, water soluble content: 8.7% by weight, weight average particle diameter (D50)=445 μm, σζ=0.38) as a product having its size adjusted, which whole amount had been passed through a mesh with a sieve mesh size of 850 μm (particle size-adjusting step). It should be noted that a stand where the sieve classification apparatus was installed was grounded with an earth resistance of 5Ω. Further, by an exhaustion apparatus installed with a bag filter, degree of reduced pressure in the sieve classification apparatus was set at 0.11 kPa, and air with a dew point of 10° C. and a temperature of 75° C. was passed at 2 m³/hr through inside the sieve classification apparatus.

While continuously producing the water-absorbing resin (A), a sample thereof was taken every time of attaining production amount of 1 ton, to measure performance of the water-absorbing resin for total amount of 20 tons. The number of samples was 20. Averages of CRC, AAP and SFC were 29.8 (g/g), 24.7 (g/g) and 34 ($\times 10^{-7} \cdot cm^3 \cdot s \cdot g^{-1}$), respectively. Standard deviations thereof were 0.19, 0.26 and 2.00, respectively. Detailed performance of the resultant water-absorbing resin (A) is shown in Table 1. An amount of residual monomers in the water-absorbing resin (A) was 410 ppm by weight.

Comparative Example 1

A particulate water-absorbing resin was continuously produced using a continuous production apparatus (a production capacity of about 1500 kg per one hour) of a water-absorbing resin, which has connected each other a polymerization step (static polymerization on a belt), a gel fine pulverization (crushing) step, a drying step, a pulverization step, a classification step (a classification step 1), a surface cross-linking step (a spray step of the surface cross-linking agent and a heating step), a cooling step, a particle size-adjusting step (a classification step 2), and transportation steps between each step, and permits each step performed continuously.

Specifically, an aqueous solution of partial neutralized sodium acrylate having a neutralization ratio of 75% by mole (concentration: 38% by weight) and containing 0.06% by mole (relative to the monomer) of polyethylene glycol diacrylate (average number of n (average polymerization degree)=9) as an inner cross-linking agent was prepared as a monomer aqueous solution (4). Then, the monomer aqueous solution (4) was fed continuously with a metering pump, and by blowing nitrogen gas continuously in the middle of a transportation pipeline, dissolved oxygen concentration was adjusted so as to be equal to or lower than 0.5 mg/L.

Next, to the monomer aqueous solution (4), sodium persulfate and L-ascorbic acid were further mixed continuously with a line mixing, in a sodium persulfate/L-ascorbic acid ratio of 0.14 (g)/0.005 (g) (relative to 1 mole of the monomer), and supplied to a flat steel belt having weirs provided at both ends thereof, to give a thickness of about 30 mm, to perform static aqueous solution polymerization continuously at 95° C. for 30 minutes (polymerization step).

A hydrogel cross-linked polymer (5) thus obtained was subjected to fine pulverization using a meat chopper with a pore diameter of 7 mm under an atmosphere of 60° C. to give a size of about 1 mm (gel fine pulverization (crushing) step). The fine pulverized hydrogel was spread and mounted on a moving porous plate of a continuous air-flow band dryer (dew point of hot air: 30° C.) to give a thickness of 50 mm, dried at 185° C. for 30 minutes, and cooled by being exposed to open air, to obtain a dried polymer (solid content: 96% by weight, temperature: 60° C.) (drying step).

The whole resultant dried polymer was continuously supplied to a three-stage roll mill (roll gap configuration; from the top, 1.0 mm/0.70 mm/0.50 mm) to be pulverized (pulverization step). Then, the pulverized polymer was classified using an vibration-type circular sieve classification apparatus (vibration number: 230 rpm, radial inclination (gradient): 11 mm, tangential inclination (gradient): 11 mm, eccentricity amount: 35 mm, temperature of the apparatus: 55° C.) with a sieve diameter of 1600 mm having metal meshes (material: SUS304, surface roughness Rz of the inner surface of the sieve: 50 nm, surface roughness Ra: 4.8 nm) with sieve mesh size of 1000 μm, 850 μm and 150 μm, to collect particles between metal meshes of 850 μm and 150 μm, and to obtain a water-absorbing resin powder (6) containing particles with 850 μm to 150 μm in an ratio of about 97% by weight (CRC=36 g/g, solid content: 96% by weight, weight average particle diameter (D50)=440 μm, σζ=0.38). It should be noted that although a stand where this sieve classification apparatus was installed was grounded, the sieve classification apparatus was installed in a state of being floated from the stand (a non-grounded state), and thus it was in a state that static electricity or the like generated in the sieve classification was not able to be discharged (classification step 1).

The water-absorbing resin powder (6) thus obtained was continuously supplied constantly at 1500 kg/hr to a high speed continuous mixer (Turbulizer, 1000 rpm). A surface treatment agent solution, composed of a mixed solution of 0.3 part by weight of 1,4-butanediol, 0.5 part by weight of propylene glycol and 2.7 parts by weight of pure water relative to 100 parts by weight of the water-absorbing resin powder, was mixed by spraying with a sprayer. Then, the resultant mixture was subjected to heat treatment continuously at 198° C. for 40 minutes with a paddle dryer (surface cross-linking step). Subsequently, the mixture under heat treatment was forced to cool down to 60° C. using a similar paddle dryer (cooling step).

Further, a portion passed through a mesh with a sieve mesh size of 850 μm was classified using the same vibration-type circular sieve classification apparatus with a sieve diameter of 1600 mm as used in the above (classification step 2). A portion remained on the mesh with a sieve mesh size of 850 μm was pulverized again, and mixed with the portion passed through a mesh with a sieve mesh size of 850 μm, to obtain a water-absorbing resin (B) (water content: 1.5% by weight, water soluble content: 8.8% by weight, weight average particle diameter (D50)=432 μm, σζ=0.40) as a product having its size adjusted, which whole amount had been passed through a mesh with a sieve mesh size of 850 μm (particle size-adjusting step). It should be noted that although a stand where this sieve classification apparatus was installed was grounded, the sieve classification apparatus was installed in a state of being floated from the stand (a non-grounded state), and thus it was in a state that static electricity or the like generated in the sieve classification was not able to be discharged.

While producing the water-absorbing resin (B), a sample thereof was taken every time of attaining production amount of 1 ton, to measure performance of the water-absorbing resin for total amount of 20 tons. The number of samples was 20. Averages of CRC, AAP and SFC were 29.9 (g/g), 24.2 (g/g) and ($\times 10^{-7} \cdot cm^3 \cdot s \cdot g^{-1}$), respectively. Standard deviations thereof were 0.34, 0.35 and 3.16, respectively. Detailed performance thereof is shown in Table 1. An amount of residual monomers in the water-absorbing resin (B) was 420 ppm by weight.

Example 2

A water-absorbing resin was continuously produced using a continuous production apparatus (a production capacity of about 1500 kg per one hour) of a water-absorbing resin, which has connected each other a polymerization step (static polymerization on a belt), a gel fine pulverization (crushing) step, a drying step, a pulverization step, a classification step (a classification step 1), a surface cross-linking step (a spray step of the surface cross-linking agent and a heating step), a cooling step, a particle size-adjusting step (a classification step 2), and transportation steps between each step, and permits each step performed continuously.

Specifically, an aqueous solution of partial neutralized sodium acrylate having a neutralization ratio of 73% by mole (concentration: 38% by weight) and containing 0.09% by mole (relative to the monomer) of polyethylene glycol diacrylate (average number of n (average polymerization degree)=9) as an inner cross-linking agent was prepared as a monomer aqueous solution (7). Then, the monomer aqueous solution (7) was fed continuously with a metering pump, and by blowing nitrogen gas continuously in the middle of a transportation pipeline, dissolved oxygen concentration was adjusted so as to be equal to or lower than 0.5 mg/L.

Next, to the monomer aqueous solution (7), sodium persulfate and L-ascorbic acid were further mixed continuously with a line mixing, in a sodium persulfate/L-ascorbic acid ratio of 0.14 (g)/0.005 (g) (relative to 1 mole of the monomer), and supplied to a flat steel belt having weirs provided at both ends thereof, to give a thickness of about 30 mm, to perform static aqueous solution polymerization continuously (continuous belt polymerization) at 97° C. for 30 minutes (polymerization step).

A hydrogel cross-linked polymer (8) thus obtained was subjected to fine pulverization using a meat chopper with a pore diameter of 7 mm under an atmosphere of 60° C. to give a size of about 1 mm (gel fine pulverization (crushing) step). The fine pulverized hydrogel was spread and mounted on a moving porous plate of a continuous air-flow band dryer (dew point of hot air: 30° C.) to give a thickness of 50 mm, dried at 190° C. for 30 minutes, and cooled by being exposed to open air, to obtain a dried polymer (solid content: 96.5% by weight, temperature: 60° C.) (drying step).

The whole resultant dried polymer was continuously supplied to a three-stage roll mill (roll gap configuration; from the top, 1.0 mm/0.60 mm/0.48 mm) to be pulverized (pulverization step). Then, the pulverized polymer was classified using an vibration-type circular sieve classification apparatus (vibration number: 230 rpm, radial inclination (gradient): 11 mm, tangential inclination (gradient): 11 mm, eccentricity amount: 35 mm, temperature of the apparatus: 55° C.) with a sieve diameter of 1600 mm having metal meshes (material: SUS304, surface roughness Rz of the inner surface of the sieve: 50 nm, surface roughness Ra: 4.8 nm) with sieve mesh size of 850 µm, 710 µm and 150 µm, to collect particles between metal meshes of 710 µm and 150 µm, and to obtain a water-absorbing resin powder (9) containing particles with 710 µm to 150 µm in an ratio of about 98% by weight (CRC=33 g/g, solid content: 96% by weight, weight average particle diameter (D50)=400 µm, σζ=0.36). It should be noted that a stand where the sieve classification apparatus was installed was grounded with an earth resistance of 5Ω. Further, by an exhaustion apparatus installed with a bag filter, degree of reduced pressure in the sieve classification apparatus was set at 0.11 kPa, and air with a dew point of 10° C. and a temperature of 75° C. was passed at 2 m³/hr through inside the sieve classification apparatus (classification step 1).

The water-absorbing resin powder (9) thus obtained was continuously supplied constantly at 1500 kg/hr to a high speed continuous mixer (Turbulizer, 1000 rpm). A surface treatment agent solution, composed of a mixed solution of 0.36 part by weight of 1,4-butanediol, 0.6 part by weight of propylene glycol and 3.24 parts by weight of pure water relative to 100 parts by weight of the water-absorbing resin powder, was mixed by spraying with a sprayer. Then, the resultant mixture was subjected to heat treatment continuously at 199° C. for 40 minutes with a paddle dryer (surface cross-linking step).

Subsequently, the mixture under heat treatment was forced to cool down to 60° C. using a similar paddle dryer. In this cooling step, 1.5 part by mass of the following aluminum sulfate treating solution was added to 100 parts by mass of heated and surface cross-linked particles, to obtain a particulate water-absorbing agent (10) having its surface coated with a polyvalent metal. The aluminum sulfate treating solution used was obtained by mixing 1 part by mass of a 27% by mass liquid aluminum sulfate solution for tap water (produced by Asada Chemical Ind. Co., Ltd.) with 0.3 part by mass of an aqueous 50% sodium lactate solution (produced by Musashino Chemical Laboratory, Ltd.) and further 0.1 part by mass of propylene glycol with the resultant mixture (cooling step).

Further, a portion passed through a mesh with a sieve mesh size of 710 µm was classified using the same vibration-type circular sieve classification apparatus with a sieve diameter of 1600 mm as used in the above (classification step 2). A portion remained on the mesh with a sieve mesh size of 710 µm was pulverized again, and mixed with the portion passed through a mesh with a sieve mesh size of 710 µm, to obtain a water-absorbing resin (C) (water content: 1.4% by weight, water-soluble amount: 6.4% by weight, weight average particle diameter (D50)=394 µm, σζ=0.38) as a product having its size adjusted, which whole amount had been passed through a mesh with a sieve mesh size of 710 µm (particle size-adjusting step). It should be noted that a stand where the sieve classification apparatus was installed was grounded with an earth resistance of 5Ω. Further, by an exhaustion apparatus installed with a bag filter, degree of reduced pressure in the sieve classification apparatus was set at 0.11 kPa, and air with a dew point of 10° C. and a temperature of 75° C. was passed at 2 m³/hr through inside the sieve classification apparatus.

While continuously producing the water-absorbing resin (C), a sample thereof was taken every time of attaining production amount of 1 ton, to measure performance of the water-absorbing resin for total amount of 20 tons. The number of samples was 20. Averages of CRC, AAP and SFC were 28.3 (g/g), 23.6 (g/g) and 103 ($\times 10^{-7} \cdot cm^3 \cdot s \cdot g^{-1}$), respectively. Standard deviations thereof were 0.18, 0.15 and 5.96, respectively. Detailed performance of the resultant water-absorbing resin (C) is shown in Table 2. An amount of residual monomers in the water-absorbing resin (C) was 450 ppm by weight.

Example 3

A water-absorbing resin was continuously produced using a continuous production apparatus (a production capacity of about 3000 kg per one hour) of a water-absorbing resin, which has connected each other a polymerization step (static polymerization on a belt), a gel fine pulverization (crushing) step, a drying step, a pulverization step, a classification step (a classification step 1), a surface cross-linking step (a spray step of the surface cross-linking agent and a heating step), a cooling step, a particle size-adjusting step (a classification step 2), and transportation steps between each step, and permits each step performed continuously. Specifically, an aqueous solution of partial neutralized sodium acrylate having a neutralization ratio of 75% by mole (concentration: 38% by weight) and containing 0.06% by mole (relative to the monomer) of polyethylene glycol diacrylate (average number of n (average polymerization degree)=9) as an inner cross-linking agent was prepared as a monomer aqueous solution (1). Then, the monomer aqueous solution (1) was fed continuously with a metering pump, and by blowing nitrogen gas continuously in the middle of a transportation pipeline, oxygen concentration was adjusted so as to be equal to or lower than 0.5 ppm.

Next, to the monomer aqueous solution (1), sodium persulfate and L-ascorbic acid were further mixed continuously with a line mixing, in a sodium persulfate/L-ascorbic acid ratio of 0.14 (g)/0.005 (g) (relative to 1 mole of the monomer), and supplied to a flat steel belt having weirs provided at both ends thereof, to give a thickness of about 30 mm, to perform static aqueous solution polymerization continuously (continuous belt polymerization) at 95° C. for 30 minutes (polymerization step).

A hydrogel cross-linked polymer (2) thus obtained was subjected to fine pulverization using a meat chopper with a pore diameter of 7 mm under an atmosphere of 60° C. to give a size of about 1 mm (gel fine pulverization (crushing) step). The fine pulverized hydrogel was spread and mounted on a moving porous plate of a continuous air-flow band dryer (dew point of hot air: 30° C.) to give a thickness of 50 mm, dried at 185° C. for 30 minutes, and cooled by being exposed to open air, to obtain a dried polymer (solid content: 96% by weight, temperature: 60° C.) (drying step). The whole resultant dried polymer was continuously supplied to a three-stage roll mill as a pulverization apparatus 4c (roll gap configuration; from the top, 1.0 mm/0.70 mm/0.50 mm) to be pulverized (pulverization step). The pulverization apparatus c is a three-stage roll mill which, as specifically shown in FIG. 1, is composed of a first pulverization apparatus c1 and second pulverization apparatuses c2 which was divided in two lines (pulverization step; two lines). Subsequently, the pulverized polymer was classified using an vibration-type circular sieve classification apparatus (vibration number: 230 rpm, radial inclination (gradient): 11 mm, tangential inclination (gradient): 11 mm, eccentricity amount: 35 mm, temperature of the apparatus: 55° C.) with a sieve diameter of 1600 mm having metal meshes (material: SUS304, surface roughness Rz of the inner surface of the sieve: 50 nm, surface roughness Ra: 4.8 nm) with sieve mesh size of 1000 µm, 850 µm and 150 µm, to collect particles between metal meshes of 850 µm and 150 µm, and to obtain a water-absorbing resin powder (3) containing particles with 850 µm to 150 µm in an ratio of about 99% by weight (CRC=36 g/g, solid content: 96% by weight, weight average particle diameter (D50)=450 µm, $\sigma\zeta$=0.34). It should be noted that a stand where the sieve classification apparatus was installed was grounded with an earth resistance of 5Ω. Further, by an exhaustion apparatus installed with a bag filter, degree of reduced pressure in the sieve classification apparatus was set at 0.11 kPa, and air with a dew point of 10° C. and a temperature of 75° C. was passed at 2 m³/hr through inside the sieve classification apparatus (classification step 1; two lines).

After the resultant particulate water-absorbing resin was placed in a hopper, it was continuously supplied constantly at 1500 kg/hr to a high speed continuous mixer (Turbulizer, 1000 rpm). A surface treatment agent solution, composed of a mixed solution of 0.3 part by weight of 1,4-butanediol, 0.5 part by weight of propylene glycol and 2.7 parts by weight of pure water relative to 100 parts by weight of the water-absorbing resin powder, was mixed by spraying with a sprayer (mixing step; two lines). Then, the particulate water-absorbing resin mixed with the surface treatment agent solution was heated with paddle dryers in two lines adjusted at 198° C. for 40 minutes (surface cross-linking step; two lines), and cooled down to 60° C. using dryers in two lines (cooling step; two lines).

After being cooled, it was temporarily stored in a hopper in one line. A portion passed through a mesh with a sieve mesh size of 850 µm was classified using the same vibration-type circular sieve classification apparatuses with a sieve diameter of 1600 mm as used in the above in two lines (classification step 2; two lines). A portion remained on the mesh with a sieve mesh size of 850 µm was pulverized again, and mixed with the portion passed through a mesh with a sieve mesh size of 850 µm, to obtain a water-absorbing resin (D) (water content: 1.5% by weight, water soluble content: 8.7% by weight, weight average particle diameter (D50)=445 µm, $\sigma\zeta$=0.38) as a product having its size adjusted, which whole amount had been passed through a mesh with a sieve mesh size of 850 µm (particle size-adjusting step; two lines). It should be noted that a stand where the sieve classification apparatus was installed was grounded with an earth resistance of 5Ω.

While continuously producing the water-absorbing resin (D), a sample thereof was taken every time of attaining production amount of 1 ton, to measure performance of the water-absorbing resin for total amount of 20 tons. The number of samples was 20. Averages of CRC, AAP and SFC were 30.3 (g/g), 25.0 (g/g) and 39 (×10⁻⁷·cm³·s·g⁻¹), respectively. Standard deviations thereof were 0.20, 0.16 and 1.99, respectively. Detailed performance of the resultant water-absorbing resin (D) is shown in Table 2. An amount of residual monomers in the water-absorbing resin (D) was 380 ppm by weight.

Example 4

The water-absorbing resin (A) obtained in Example 1 was packaged by passing the water-absorbing resin (A) through compressed air (a dew point of −15° C., and a temperature of 35° C.) in a pipeline with a surface roughness (Rz) of the inner surface of 200 nm to pneumatically transport it. After the pneumatic transportation, the water-absorbing resin (A) had an average SFC of 33.4 (×10⁻⁷·cm³·s·g⁻¹), and average decrease rate of SFC of 1.8%.

Example 5

The pneumatic transportation was similarly performed as in Example 4, except that compressed air with a dew point of 20° C. was used instead. After the pneumatic transportation, average SFC was 32.3 (×10⁻⁷·cm³·s·g⁻¹), and average decrease rate of SFC was 5.0%.

TABLE 1

| Example 1 Sample No. | CRC [g/g] | AAP [g/g] | SFC [$10^{-7} \cdot cm^3 \cdot s \cdot g^{-1}$] | Com. Exp. 1 Sample No. | CRC [g/g] | AAP [g/g] | SFC [$10^{-7} \cdot cm^3 \cdot s \cdot g^{-1}$] |
|---|---|---|---|---|---|---|---|
| 1 | 30.0 | 24.2 | 32 | 1 | 29.0 | 23.0 | 35 |
| 2 | 29.9 | 24.4 | 33 | 2 | 30.2 | 24.2 | 28 |
| 3 | 29.7 | 25.0 | 35 | 3 | 29.8 | 24.1 | 30 |
| 4 | 29.5 | 24.8 | 38 | 4 | 29.5 | 23.8 | 32 |
| 5 | 29.6 | 24.9 | 37 | 5 | 29.8 | 24.1 | 34 |
| 6 | 29.7 | 24.5 | 36 | 6 | 30.1 | 24.2 | 30 |
| 7 | 30.0 | 24.8 | 31 | 7 | 30.1 | 24.5 | 25 |
| 8 | 29.9 | 24.4 | 32 | 8 | 30.2 | 24.5 | 24 |
| 9 | 29.8 | 25.1 | 35 | 9 | 29.8 | 24.0 | 32 |
| 10 | 29.8 | 24.6 | 34 | 10 | 29.7 | 24.0 | 33 |

TABLE 1-continued

| Example 1 Sample No. | CRC [g/g] | AAP [g/g] | SFC [$10^{-7} \cdot cm^3 \cdot s \cdot g^{-1}$] | Com. Exp. 1 Sample No. | CRC [g/g] | AAP [g/g] | SFC [$10^{-7} \cdot cm^3 \cdot s \cdot g^{-1}$] |
|---|---|---|---|---|---|---|---|
| 11 | 29.6 | 24.2 | 36 | 11 | 30.3 | 24.5 | 29 |
| 12 | 29.5 | 24.4 | 35 | 12 | 30.2 | 24.3 | 29 |
| 13 | 29.9 | 24.7 | 33 | 13 | 30.0 | 24.4 | 28 |
| 14 | 29.8 | 24.9 | 32 | 14 | 30.4 | 24.5 | 25 |
| 15 | 30.3 | 24.9 | 32 | 15 | 30.0 | 24.2 | 31 |
| 16 | 29.9 | 24.6 | 32 | 16 | 29.9 | 24.1 | 28 |
| 17 | 29.9 | 24.8 | 33 | 17 | 30.2 | 24.3 | 27 |
| 18 | 29.8 | 24.8 | 34 | 18 | 30.3 | 24.5 | 25 |
| 19 | 29.8 | 24.8 | 36 | 19 | 29.8 | 24.2 | 28 |
| 20 | 30.0 | 24.8 | 32 | 20 | 29.5 | 23.8 | 32 |
| Arithmetic Average | 29.8 | 24.7 | 34 | Arithmetic Average | 29.9 | 24.2 | 29 |
| Standard Deviation | 0.19 | 0.26 | 2.00 | Standard Deviation | 0.34 | 0.35 | 3.16 |

TABLE 2

| Example 2 Sample No. | CRC [g/g] | AAP [g/g] | SFC [$10^{-7} \cdot cm^3 \cdot s \cdot g^{-1}$] | Example 3 Sample No. | CRC [g/g] | AAP [g/g] | SFC [$10^{-7} \cdot cm^3 \cdot s \cdot g^{-1}$] |
|---|---|---|---|---|---|---|---|
| 1 | 28.3 | 23.5 | 94 | 1 | 30.5 | 24.9 | 36 |
| 2 | 28.5 | 23.5 | 98 | 2 | 30.4 | 24.8 | 39 |
| 3 | 28.2 | 23.7 | 98 | 3 | 30.3 | 25.2 | 39 |
| 4 | 28.0 | 23.5 | 99 | 4 | 30.2 | 24.9 | 41 |
| 5 | 28.3 | 23.6 | 93 | 5 | 30.0 | 25.3 | 41 |
| 6 | 28.1 | 23.7 | 105 | 6 | 30.5 | 25.1 | 39 |
| 7 | 28.4 | 23.4 | 114 | 7 | 29.9 | 25.0 | 40 |
| 8 | 28.2 | 23.4 | 111 | 8 | 30.3 | 24.9 | 39 |
| 9 | 28.2 | 23.6 | 107 | 9 | 30.5 | 25.3 | 37 |
| 10 | 28.3 | 23.5 | 108 | 10 | 30.0 | 24.7 | 43 |
| 11 | 28.1 | 23.7 | 103 | 11 | 30.4 | 25.0 | 39 |
| 12 | 28.2 | 23.4 | 107 | 12 | 30.4 | 25.0 | 36 |
| 13 | 28.6 | 23.7 | 101 | 13 | 30.4 | 24.9 | 38 |
| 14 | 28.4 | 23.6 | 99 | 14 | 30.3 | 25.0 | 39 |
| 15 | 28.4 | 23.5 | 103 | 15 | 30.3 | 24.9 | 42 |
| 16 | 28.3 | 23.8 | 103 | 16 | 30.5 | 24.8 | 35 |
| 17 | 28.7 | 23.5 | 111 | 17 | 30.4 | 25.0 | 38 |
| 18 | 28.0 | 23.9 | 108 | 18 | 29.9 | 24.8 | 40 |
| 19 | 28.2 | 23.3 | 106 | 19 | 30.3 | 25.1 | 39 |
| 20 | 28.2 | 23.7 | 95 | 20 | 30.1 | 25.0 | 39 |
| Arithmetic Average | 28.3 | 23.6 | 103 | Arithmetic Average | 30.3 | 25.0 | 39 |
| Standard Deviation | 0.18 | 0.15 | 5.96 | Standard Deviation | 0.20 | 0.16 | 1.99 |

SUMMARY

As mentioned above, it is noted from comparison between Example 1 (electricity was eliminated in the classification step) and Comparative Example 1 (electricity was not eliminated in the classification step) that the production method of the present invention permits enhancement of average absorption against pressure (AAP) by 0.5 (g/g), and enhancement of average liquid permeability (SFC) by 5 ($\times 10^{-7} \cdot cm^3 \cdot s \cdot g^{-1}$). Further, it has been confirmed from comparison between Examples 1 to 3 and Comparative Example 1 that the production method of the present invention permits decrease in standard deviation which is deflection of CRC and AAP by about 40%, indicating stable continuous production possible. In particular, 4 times value of standard variation ($\sigma$) of AAP and SFC was equal to or smaller than 4.5% of average values (arithmetic averages) of these properties. Further, 4 times value of standard variation ($\sigma$) of SFC was equal to or smaller than 40% of average value (arithmetic average) of SFC. From these results, it has been confirmed that, by using the production method of the present invention, stable diapers without property variation can be provided. Further it is noted from comparison between Example 1 and Example 3 that absorption against pressure (AAP) or liquid permeability (SFC) can be enhanced more significantly by using the classification step or the surface cross-linking step in two lines for one line of polymerization.

It is noted from comparison between Example 4 and Example 5 that pneumatic transportation using air having a specified dew point or less can be preferably used in view of property of a water-absorbing resin.

INDUSTRIAL APPLICABILITY

The present invention permits enhancement of property of a water-absorbing resin, and also permits stable continuous production.

The invention claimed is:
1. A method for the production of a water-absorbing resin which comprises:
a polymerization step for polymerizing an aqueous solution of acrylic acid (or salt thereof) to obtain a hydrogel cross-linked polymer;

a drying step for drying said hydrogel cross-linked polymer to obtain a water-absorbing resin powder;

a classification step for classifying said water-absorbing resin powder; and a surface cross-linking step for surface cross-linking said water-absorbing resin powder before or after the classification step;

wherein electricity is eliminated in the classification step.

2. The method according to claim 1, wherein the electricity is eliminated by at least one means selected from the group consisting of ionized air flow, antistatic brush and grounding.

3. The method according to claim 1, wherein the electricity is eliminated by grounding wherein earth resistance is equal to or lower than 100Ω.

4. The method according to claim 1, wherein the classification step is performed under reduced pressure.

5. The method according to claim 1, wherein air flow is passed through the classification step, and dew point of the air flow is equal to or lower than 15° C.

6. The method according to claim 1, wherein sieve classification is used in the classification step, and a temperature of a sieve to be used in the classification step is 40 to 80° C.

7. The method according to claim 1, wherein sieves having at least three kinds of sieve mesh sizes are used in the classification step.

8. The method according to claim 1, wherein normal saline flow conductivity (SFC) of the water-absorbing resin subjected to the surface cross-linking step is equal to or higher than 10 $(\times 10^{-7} \cdot cm^3 \cdot s \cdot g^{-1})$.

9. The method according to claim 1, wherein sieve classification is used in the classification step, and a surface roughness (Rz) of an inner surface of a sieve to be used in the classification step is equal to or smaller than 800 nm.

10. The method according to claim 1, wherein the water-absorbing resin is continuously produced in an amount of equal to or higher than 1 ton per 1 hour.

11. The method according to claim 1, wherein the water-absorbing resin is produced in the shape of an irregular particle by continuous kneader polymerization or continuous belt polymerization.

12. The method according to claim 1, wherein the water content of the water-absorbing resin is equal to or lower than 5% by weight.

13. The method according to claim 1, further comprising an iron removal step after the classification step.

14. The method according to claim 1, wherein the classification step is performed before and after the surface cross-linking step.

15. The method according to claim 1, further comprising a step for recycling fine powder of the water-absorbing resin after the classification step.

16. The method according to claim 1, wherein the water-absorbing resin before and after the classification step is pneumatically transported by air having a dew point of equal to or lower than 20° C.

17. The method according to claim 1, wherein the electricity is eliminated for at least one of a classification apparatus, the water-absorbing resin and a sieve used in the sieve classification.

18. The method according to claim 1, wherein steps from the polymerization step prior to the classification step is arrayed in one line, and the classification step is divided into two or more lines.

19. The method according to claim 1, wherein the surface cross-linking step is divided into two or more lines per one line of the polymerization step.

20. The method according to claim 1, wherein all of the classification step and the surface cross-linking step are divided in two or more lines per one line of the polymerization step.

21. The method according to claim 1, wherein a covalent surface cross-linking agent and an ion binding surface cross-linking agent are used in combination in the surface cross-linking step.

22. A method for enhancing liquid permeability of a water-absorbing resin which comprises:

a polymerization step for polymerizing an aqueous solution of acrylic acid (or salt thereof) to obtain a hydrogel cross-linked polymer;

a drying step for drying said hydrogel cross-linked polymer to obtain a water-absorbing resin powder;

a classification step for classifying said water-absorbing resin powder; and a surface cross-linking step for surface cross-linking said water-absorbing resin powder before or after the classification step;

wherein electricity is eliminated in the classification step.

23. The method according to claim 22, wherein normal saline flow conductivity (SFC) of the water-absorbing resin subjected to the surface cross-linking step is equal to or higher than 10 $(\times 10^{-7} \cdot cm^3 \cdot S \cdot g^{-1})$.

* * * * *